(12) United States Patent
Kawashima et al.

(10) Patent No.: US 7,292,425 B2
(45) Date of Patent: Nov. 6, 2007

(54) MAGNETIC BEARING DEVICE AND TURBO MOLECULAR PUMP WITH THE MAGNETIC BEARING DEVICE MOUNTED THERETO

(75) Inventors: Toshiaki Kawashima, Chiba (JP); Hirotaka Namiki, Chiba (JP); Hideo Fukami, Chiba (JP)

(73) Assignee: BOC Edwards Japan Limited (JP)

( * ) Notice: Subject to any disclaimer, the term of this patent is extended or adjusted under 35 U.S.C. 154(b) by 282 days.

(21) Appl. No.: 11/088,063

(22) Filed: Mar. 23, 2005

(65) Prior Publication Data

US 2005/0212370 A1    Sep. 29, 2005

(30) Foreign Application Priority Data

Mar. 25, 2004    (JP)    .............................. 2004-089147

(51) Int. Cl.
*H02K 7/09* (2006.01)
(52) U.S. Cl. ...................... 361/143; 310/90.5
(58) Field of Classification Search ................ 361/139, 361/143; 310/90.5; 318/524
See application file for complete search history.

(56) References Cited

U.S. PATENT DOCUMENTS 6,653,830 B2 *    11/2003    Luetzow ................ 324/207.21

FOREIGN PATENT DOCUMENTS

| EP | 1233189 | 8/2002 |
|---|---|---|
| EP | 1318310 | 6/2003 |
| EP | 1396649 | 3/2004 |

* cited by examiner

*Primary Examiner*—Michael Sherry
*Assistant Examiner*—Danny Nguyen
(74) *Attorney, Agent, or Firm*—Adams & Wilks

(57) ABSTRACT

To provide a magnetic bearing device capable of reducing vibration by preventing a deterioration in the control of a rotor shaft due to a variation in the axial position of the rotor shaft, while performing positional control over the rotor shaft in a specific attitude with optimal magnetic force, and to a turbo molecular pump with the magnetic bearing device mounted thereto. A sensitivity storage section 281 stores therein a sensor sensitivity used in a sensor sensitivity adjustment. The sensitivity storage section 281 outputs the stored sensor sensitivity to a sensitivity switching section. The sensitivity switching section switches the sensor sensitivity according to the situation, and outputs the result to a sensor signal amplifier section. The sensor signal amplifier section 252 performs, to a sensor signal, the sensor sensitivity adjustment according to the sensor sensitivity stored in the sensitivity storage section 281, and outputs, to an A/D converter 154, a sensor output signal 153 having a sensor output voltage V after the sensor sensitivity adjustment.

9 Claims, 14 Drawing Sheets

FIG. 13
PRIOR ART
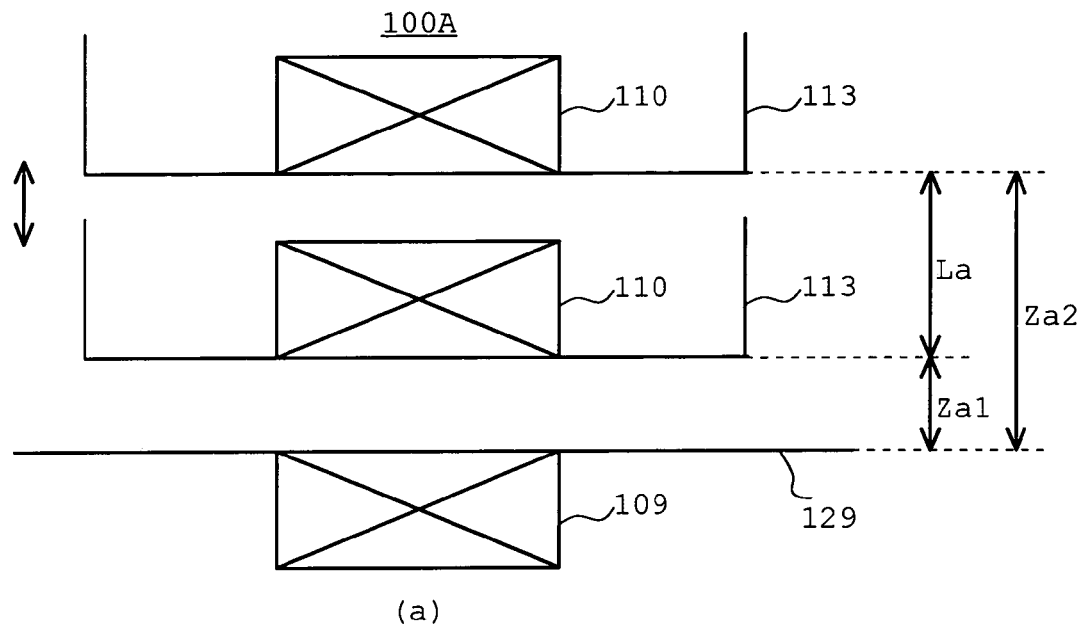
(a)
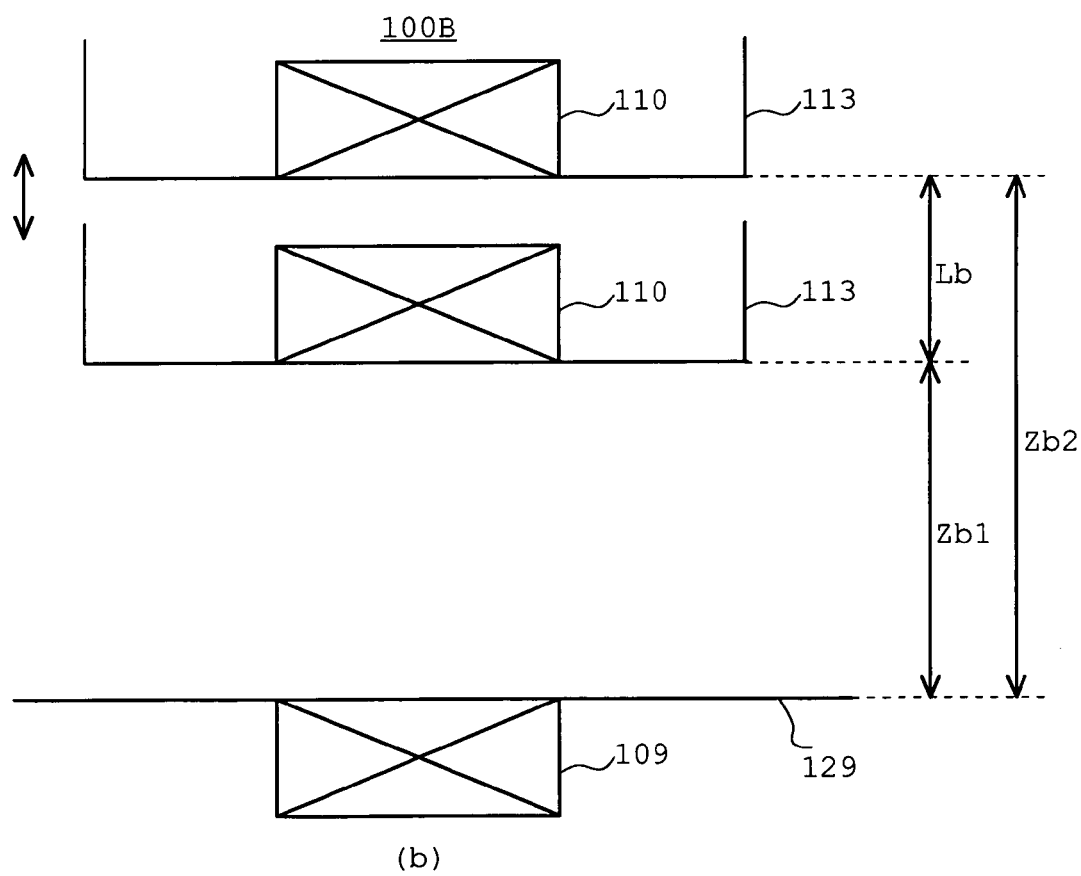
(b)

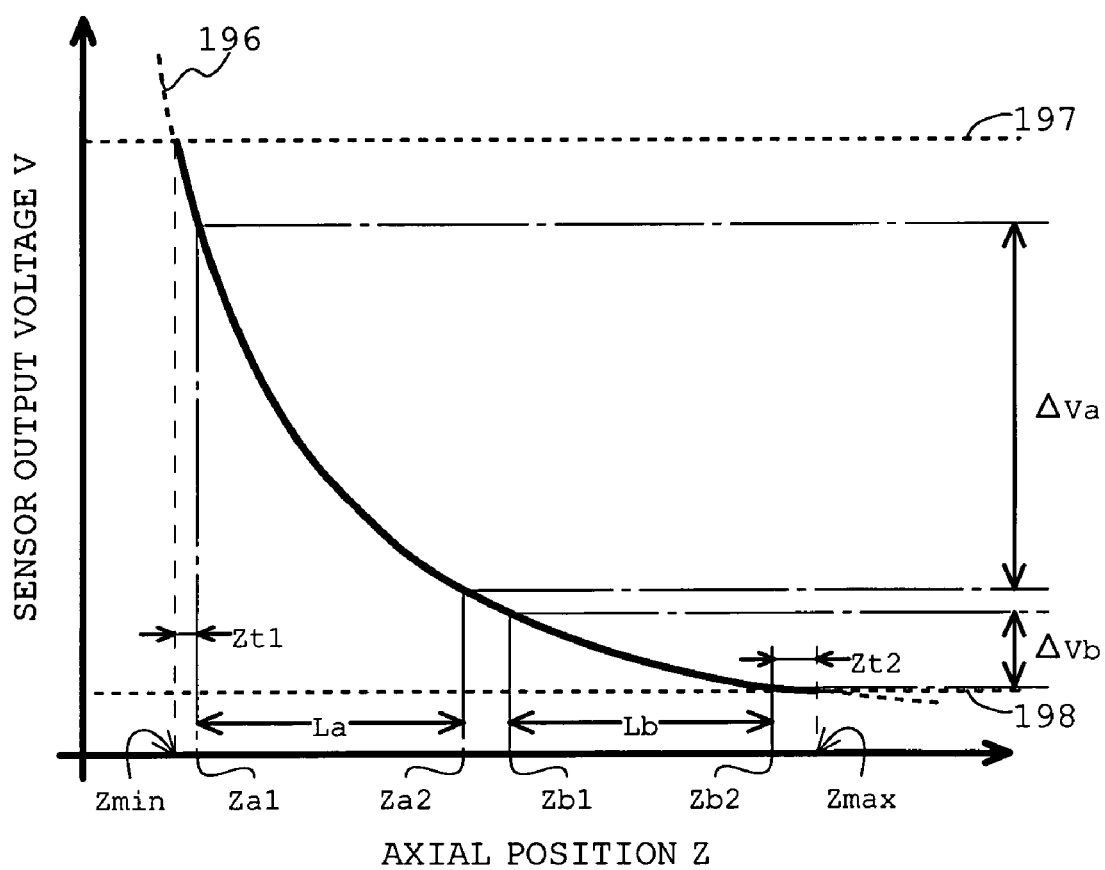

MAGNETIC BEARING DEVICE AND TURBO MOLECULAR PUMP WITH THE MAGNETIC BEARING DEVICE MOUNTED THERETO

BACKGROUND OF THE INVENTION

1. Field of the Invention

The present invention relates to a magnetic bearing device and a turbo molecular pump with the magnetic bearing device mounted thereto. More specifically, the present invention relates to a magnetic bearing device capable of reducing vibration by preventing a deterioration in the control of a rotor shaft due to a variation in the axial position of the rotor shaft, while performing positional control over the rotor shaft in a specific posture with optimal magnetic force, and to a turbo molecular pump with the magnetic bearing device mounted thereto.

2. Description of the Related Art

With the development of electronics in recent years, demands for semiconductors for forming memories, integrated circuits, etc. are rapidly increasing. Those semiconductors are manufactured such that impurities are doped into a semiconductor substrate with a very high purity to impart electrical properties thereto, or semiconductor substrates with minute circuit patterns formed thereon are laminated. Those manufacturing steps must be performed in a chamber with a high vacuum state so as to avoid influences of dust etc. in the air. As a pump device, a vacuum pump is generally used to evacuate this chamber. In particular, a turbo molecular pump, one kind of the vacuum pump, is widely used since it entails little residual gas and is easy of maintenance. The semiconductor manufacturing process includes a number of steps in which various process gases are caused to act onto a semiconductor substrate, and the turbo molecular pump is used not only to evacuate the chamber but also to discharge those process gases from the chamber.

Further, in equipment for an electron microscope etc., a turbo molecular pump is used to create a high vacuum state in the chamber of the electron microscope etc. in order to prevent refraction etc. of an electron beam caused by the presence of dust or the like. FIG. 10 is a vertical sectional view of this turbo molecular pump.

In FIG. 10, a turbo molecular pump 100 includes an outer cylinder 127 with an intake hole 101 formed on top thereof. Provided inside the outer cylinder 127 is a rotor 103 having in its periphery a plurality of rotor blades 102a, 102b, 102c . . . serving as turbine blades for sucking and discharging gas and formed radially in a number of stages. At the center of the rotor 103, a rotor shaft 113 is mounted with being supported in a levitating state in the air and controlled in position, for example, by a 5-axis control magnetic bearing.

Upper radial electromagnet 104 includes four electromagnets arranged in pairs in X- and Y-axis and plus- and minus-side directions (although not shown in the drawing, one group of electromagnets on the plus-side is referred to as upper radial electromagnet 104+, while the other group of electromagnets on the minus-side is referred to as upper radial electromagnet 104−. Further, there is provided an upper radial sensor 107 constituted of four electromagnets arranged in close proximity to and in correspondence with the upper radial electromagnets 104.

The upper radial sensor 107 is an inductance type sensor of a differential type by which the position of the rotor shaft 113 in X-axis direction and that in Y-axis direction are each detected from the two directions of plus- and minus-side directions, and by which a sensor signal corresponding to the radial position of the rotor shaft 113 is output to a magnetic bearing control section of a control device or the like (not shown in the drawing). The magnetic bearing control section excites and controls the upper radial electromagnets 104 based on the sensor signal from the upper radial sensor 107, thus the radial position of the upper portion of the rotor shaft 113 being adjusted.

The rotor shaft 113 is formed of a high-magnetic-permeability material (e.g., iron) and is adapted to be attracted by the magnetic force of the upper radial electromagnets 104. Such adjustment is conducted independently in the X-axis direction and the Y-axis direction.

Similarly, lower radial electromagnet 105 includes four electromagnets arranged in pairs in X- and Y-axis and plus- and minus-side directions (although not shown in the drawing, one group of electromagnets on the plus-side is referred to as lower radial electromagnet 105+, while the other group of electromagnets on the minus-side is referred to as lower radial electromagnet 105−. Further, there is provided a lower radial sensor 108 constituted of four electromagnets arranged in close proximity to and in correspondence with the lower radial electromagnets 105.

This lower radial sensor 108 is also an inductance type sensor of a differential type. The radial position of the lower portion of the rotor shaft 113 is adjusted by a magnetic bearing control section such as a control device (not shown in the drawing).

Further, axial electromagnets 106 are arranged on the upper and lower sides of a metal disc 111 provided in the lower portion of the rotor shaft 113 (in FIG. 10, one electromagnet on the upper side is referred to as an axial electromagnet 106− on the minus-side, while the other electromagnet on the lower side is referred to as an axial electromagnet 106+ on the plus side). The axial electromagnet 106− on the minus-side attracts, by the magnetic force, the magnetic disc 111 toward the intake hole 101 side, and the axial electromagnet 106+ on the plus side attracts the magnetic disc 111 toward a base portion 129 side. The metal disc 111 is formed of a high-magnetic-permeability material such as iron.

In the base portion 129 arranged at the bottom of the outer cylinder 127, an axial sensor 109 is provided to detect an axial position Z of the rotor shaft 113. This axial sensor 109 detects the axial position Z of the rotor shaft 113 by detecting the position of a sensor target 110 embedded in the lower end portion of the rotor shaft 113, and outputs a sensor signal corresponding to this axial position Z to a control device such as a magnetic bearing control section 150 (will be described later with reference to FIG. 11).

The axial sensor 109 is an inductance type sensor as well as the upper radial sensor 107 and the lower radial sensor 108, and is provided only at the lower end side of the rotor shaft 113 to detect the axial position Z of the rotor shaft 113 from only one direction. Because installing another axial sensor at the upper side, which is difficult in itself, causes the complexity in structure. This inductance type sensor provides a sufficient quality in vibration with the turbo molecular pump 100, which is used with a great emphasis on its flow rate. Thus, in the turbo molecular pump 100 in existence, the axial sensor 109 is not a differential type sensor to avoid an increase in the number of components lead to an increase in cost. Therefore, the axial sensor 109 is different from the above-described upper radial sensor 107 and lower radial sensor 108 in that it is an inductance type sensor of a single-acting type.

The axial electromagnets 106 are excited and controlled by the magnetic bearing control section 150 on the basis of the sensor signal from the axial sensor 109. In this way, the magnetic bearing control section 150 has a function to appropriately control the magnetic force exerted on the metal disc 111 by the axial electromagnets 106 to magnetically levitate the rotor shaft 113 in the axial direction, thereby retaining the rotor shaft 113 in the space in a non-contact state.

A motor 121 is equipped with a plurality of magnetic poles, which are arranged circumferentially to surround the rotor shaft 113. The magnetic poles are controlled by a control device to rotate the rotor shaft 113 through an electromagnetic force acting between the rotor shaft 113 and the magnetic poles. The motor 121 also has an RPM sensor (not shown in the drawing) incorporated to output a detection signal, which is used for detection of RPM of the rotor shaft 113. A phase sensor (not shown in the drawing) is attached in the vicinity of the lower radial sensor 108 to detect the phase of rotation of the rotor shaft 113.

A plurality of stationary blades 123a, 123b, 123c . . . are arranged so as to be spaced apart from the rotor blades 102a, 102b, 102c . . . by small gaps. To downwardly transfer the molecules of exhaust gas through collision, the rotor blades 102a, 102b, 102c . . . are inclined by a predetermined angle with respect to a plane perpendicular to the axis of the rotor shaft 113. Similarly, the stationary blades 123 are also inclined by a predetermined angle with respect to a plane perpendicular to the axis of the rotor shaft 113, and extend toward the inner side of the outer cylinder 127 to be arranged alternately with the rotor blades 102.

The stationary blades 123 are supported at one end by being inserted into gaps between a plurality of stationary blade spacers 125a, 125b, 125c . . . stacked together in stages. The stationary blade spacers 125 are ring-shaped members, which are formed of a metal, such as aluminum, iron, stainless steel, or copper, or an alloy containing such metal as a component.

In the outer periphery of the stationary blade spacers 125, the outer cylinder 127 is secured in position with a small gap therebetween. At the bottom of the outer cylinder 127, there is arranged a base portion 129, and a threaded spacer 131 is arranged between the lowermost one of the stationary blade spacers 125 and the base portion 129. In the portion of the base portion 129 below the threaded spacer 131, there is formed a discharge outlet 133 which communicates with the outside. The threaded spacer 131 is a cylindrical member formed of a metal, such as aluminum, copper, stainless steel, or iron, or an alloy containing such metal as a component, and has a plurality of spiral thread grooves 131a in its inner peripheral surface. The spiral direction of the thread grooves 131a is determined such that when the molecules of the exhaust gas move in the rotating direction of the rotor 103, these molecules are transferred toward the discharge outlet 133.

Connected to the lowermost one of the rotor blades 102a, 102b, 102c . . . of the rotor 103 is a rotor blade 102d, which extends vertically downwards. The outer peripheral surface of the rotor blade 102d sticks out toward the inner peripheral surface of the threaded spacer 131 in a cylindrical shape, and is in close proximity to the inner peripheral surface of the threaded spacer 131 with a predetermined gap therebetween.

The base portion 129 is a disc-like member constituting the base of the turbo molecular pump 100, and is generally formed of a metal, such as iron, aluminum, or stainless steel. The base portion 129 physically retains the turbo molecular pump 100, and also functions as a heat conduction passage.

Thus, the base portion 129 is preferably formed of a metal that is rigid and of high heat conductivity, such as iron, aluminum, or copper.

In the above-described construction, when the rotor blades 102 are driven and rotated by the motor 121 together with the rotor shaft 113, an exhaust gas from a chamber is sucked in through the intake hole 101 by the action of the rotor blades 102 and the stationary blades 123. The exhaust gas sucked in through the intake hole 101 passes between the rotor blades 102 and the stationary blades 123, and is transferred to the base portion 129. At this point, the temperature of the rotor blades 102 is raised by frictional heat generated as the exhaust gas comes into contact with the rotor blades 102 and by heat generated and conducted from the motor 121. Such heat is transferred to the stationary blades 123 through radiation or through conduction of gas molecules of exhaust gas or the like.

The stationary blade spacers 125 are joined to one another on the outer periphery and send, to the outside, heat which the stationary blades 123 receive from the rotor blades 102 as well as frictional heat generated upon contact between exhaust gas and the stationary blades 123. The exhaust gas transferred to the base portion 129 is sent to the discharge outlet 133 while being guided by the thread grooves 131a of the threaded spacer 131.

The turbo molecular pump 100 requires control based on individually adjusted specific parameters (e.g., identification of the model and characteristics corresponding to the model). To store the control parameters, the turbo molecular pump main body 100 contains an electronic circuit portion 141 in its main body. The electronic circuit portion 141 is composed of a semiconductor memory, such as EEP-ROM, electronic parts, such as semiconductor devices for access to the semiconductor memory, a substrate 143 for mounting these components thereto, etc. This electronic circuit portion 141 is accommodated at the portion below the center of the base portion 129, and is closed by a hermetic bottom cover 145.

Given next is a detailed description of the magnetic bearing control section 150 for exciting and controlling the axial electromagnets 106 of the turbo molecular pump 100 structured as above.

A block diagram of a conventional magnetic bearing control section 150 is shown in FIG. 11. Although the following description is about the magnetic bearing control section 150 for controlling the axial electromagnets 106, other magnetic bearing control sections for controlling the upper radial electromagnets 104 or the lower radial electromagnets 105 have the same structure if not otherwise specified.

In FIG. 11, the sensor signal amplifier section 152 of the magnetic bearing control section 150 is input with a sensor signal output from the axial sensor 109. This sensor signal is a signal corresponding to the axial position Z of the rotor shaft 113. The sensor signal amplifier section 152 performs a fixed sensor sensitivity adjustment to the sensor signal to output an sensor output signal 153 after the sensitivity adjustment to an A/D converter 154. The sensor sensitivity adjustment means adjusting a gain value or the like of the sensor signal amplifier section 152. The sensor output signal 153 output from the sensor signal amplifier section 152 has a predetermined voltage value (hereinafter referred to as a sensor output voltage V) by this sensor sensitivity adjustment.

The A/D converter 154 performs digital conversion to the sensor output voltage V of the sensor output signal 153 to output a converted digital sensor signal 155 to a levitation control section 156. The levitation control section 156 performs a PID adjustment based on the digital sensor signal 155 or the like to output an electromagnet excitation signal 157 to an electromagnet excitation section 158. The electromagnet excitation section 158 is constituted, for example, of a bridge circuit having two transistors and two diodes, and increases or reduces, depending on the electromagnet excitation signal 157, the electromagnetic current caused to flow between the electromagnet excitation section 158 and the axial electromagnets 106.

At this point, the levitation control section 156 is input with a levitation constant signal 162, which represents a levitation constant F required for the control or the like of the electromagnets 104, 105, and 106. This levitation constant F is previously set in a levitation constant setting section 161 and includes constants for adjusting the magnetic force caused in the axial electromagnets 106, such as a constant for determining a value P of the PID adjustment in the levitation control section 156, and a constant for determining a stationary current value of the electromagnet current caused to flow in the axial electromagnets 106 or the like via the electromagnet excitation section 158.

In this structure, when the axial position Z of the rotor shaft 113 changes, the sensor signal input to the magnetic bearing control section 150 for controlling the axial electromagnets 106 is changed, thereby the sensor output voltage V of the sensor output signal 153 is changed. The relation between this axial position Z and the sensor output voltage V is shown in FIG. 12.

In FIG. 12, the horizontal axis represents the axial position Z while the vertical axis represents the sensor output voltage V. At this point, differently from the upper radial sensor 107 and the lower radial sensor 108, the axial sensor 109 is an inductance type sensor of a single-acting type in consideration of an increase in the number of components or the like. The sensor output voltage V is in inverse proportion to the square of the axial position Z ($V \propto 1/Z^2$). Thus, the relation between the axial position Z and the sensor output voltage V can be represented as a curved line 196. In the case of the upper radial sensor 107 and the lower radial sensor 108, each of which is an inductance type sensor of a differential type, the relation between the axial position Z and the sensor output voltage V can be represented as a linear curve (not shown in the drawing).

Then, the sensor output voltage V has an upper limit value 197 and a lower limit value 198 that are determined by the characteristic of the A/D converter 154, to which the sensor output signal 153 is input. Thus, the axial position Z, corresponding to the sensor output voltage V, has a minimum value Zmin with respect to the upper limit value 197, and a maximum value Zmax with respect to the lower limit value 198. Specifically, when the axial position Z gets below the minimum value Zmin or above the maximum value Zmax, the change in the axial position Z cannot be detected by the A/D converter 154. It is noted that such a turbo molecular pump 100 as in which the axial position Z is not within the range from the minimum value Zmin to the maximum value Zmax, due to manufacturing process or the like, is subject to be discarded or reassembled, for example.

As shown in FIG. 12, when the axial position Z is moved further from the axial sensor 109 by a displacement ΔZ for example, then the sensor output voltage V is lowered by a voltage change amount ΔV in accordance with this displacement ΔZ. When this voltage change amount ΔV is detected by the A/D converter 154, the digital sensor signal 155 is changed. Thus, the position of the rotor shaft 113 can be adjusted by letting the levitation control section 156 and the electromagnet excitation section 158 to excite and control the axial electromagnets 106 based on the change of the digital sensor signal 155. The same applies to the case where the axial position Z is moved closer to the axial sensor 109.

By the way, the axial position Z of the rotor shaft 113 is generally set by the μm with respect to the axial sensor 109. Thus, in some cases, there could be a variation, due to manufacturing process, in the axial position Z of the rotor shaft 113 among a plurality of turbo molecular pumps 100, 100 . . . .

This variation in the axial position is shown in FIG. 13. Among a plurality of turbo molecular pumps 100, 100 . . . in each of which the axial position Z is within the range from the minimum value Zmin to the maximum value Zmax as described above: the turbo molecular pump 100 in FIG. 13(a) (hereinafter referred to as a turbo molecular pump 100A) has the narrowest gap between the axial sensor 109 and the sensor target 110; and the turbo molecular pump 100 in FIG. 13(b) (hereinafter referred to as a turbo molecular pump 100B) has the widest gap between the axial sensor 109 and the sensor target 110. The relation between the axial position Z and the sensor output voltage V for these two types of turbo molecular pumps 100A and 100B is shown in FIG. 14.

In FIG. 13 and FIG. 14, in the case of the turbo molecular pump 100A having a narrow gap in the axial direction, a proximal position Za1, at which the rotor shaft 113 is proximal to the axial sensor 109, substantially coincides with the minimum value Zmin of the axial position Z, which is determined by the characteristic of the A/D converter 154, with a margin Zt1 therebetween. In this turbo molecular pump 100A, the rotor shaft 113 can move within the range of a movable stroke La, which is from the proximal position Za1 to a distal position Za2. As a result, the sensor output voltage V can be changed by a voltage change amount Δva.

At this point, each of the proximal position Za1 and the distal position Za2 of the rotor shaft 113 is a position that is determined by the arrangement of the rotor shaft 113, the metal disc 111, and a bearing 120 or the like. Thus, as shown in FIG. 10, when the rotor shaft 113 is at the proximal position Za1, a gap 137 between the rotor shaft 113 and the bearing 120 is cleared, while when the rotor shaft 113 is at the distal position Za2, a gap 138 between the bearing 120 and the metal disc 111 is cleared.

On the other hand, in the case of the turbo molecular pump 100B having a wide gap in the axial direction, a distal position Zb2, at which the rotor shaft 113 is distal to the axial sensor 109, substantially coincides with the maximum value Zmax of the axial position Z, which is determined by the characteristic of the A/D converter 154, with a margin Zt2 therebetween. In this turbo molecular pump 100B, the rotor shaft 113 can move within the range of a movable stroke Lb, which is from the distal position Zb2 to a proximal position Zb1. As a result, the sensor output voltage V can be changed by a voltage change amount ΔVb. Each of the proximal position Zb1 and the distal position Zb2 of the rotor shaft 113 is also determined by the arrangement of the rotor shaft 113, the metal disc 111, and the bearing 120 or the like.

In some cases, there could be a variation, due to the arrangement of the rotor shaft 113, the metal disc 111, and the bearing 120 or the like, in the movable strokes La and Lb among a plurality of turbo molecular pumps 100, 100 . . . However, in FIG. 14, it is assumed that La equals Lb for simplification.

By the way, in the turbo molecular pump 100A having a narrow gap in the axial direction, when a voltage change amount ΔVa of the sensor output voltage V per the movable stroke La is defined as a resolution Ra, the definition can be expressed as Ra=ΔVa/La. On the other hand, in the turbo molecular pump 100B having a wide gap in the axial direction, when a voltage change amount ΔVb of the sensor output voltage V per the movable stroke Lb is defined as a resolution Rb, the definition can be expressed as Rb=ΔVb/Lb The resolutions Ra and Rb represent derivative value dV/dZ of the sensor output voltage V in the strokes La and Lb respectively.

At this point, when the axial position Z of the rotor shaft 113 is within the range from the minimum value Zmin to the maximum value Zmax, the sensor output voltage V is in inverse proportion to the square of the axial position Z of the rotor shaft 113 (V∞1/$Z^2$). Thus, the closer the axial position Z of the rotor shaft 113 approaches to the minimum value Zmin, the larger the derivative value dV/dZ of the sensor output voltage V becomes. While, the further the axial position Z the rotor shaft 113 recedes from the minimum value Zmin, the smaller the derivative value dV/dZ of the sensor output voltage V becomes.

Thus, the resolution Rb in the turbo molecular pump 100B having a wide gap in the axial direction could become lower than the resolution Ra in the turbo molecular pump 100A having a narrow gap in the axial direction. Due to this reason, even when the displacement ΔZ generated in the rotor shaft 113 of each turbo molecular pump is the same, the voltage change amount ΔVb of the turbo molecular pump 100B becomes smaller than the voltage change amount ΔVa of the turbo molecular pump 100A, by which a minute displacement ΔZ of the rotor shaft 113 in the turbo molecular pump 100B is difficult to be detected, resulting in a deterioration in the control of the rotor shaft 113.

Thus, the rotor shaft 113 of the turbo molecular pump 100B having a wide gap could vibrate harder than that of the turbo molecular pump 100A having a narrow gap, which makes the entire turbo molecular pump 100B vibrated, thereby the operation in the chamber is affected. Further, a hard vibration of the rotor 103 could increase heat generated from the rotor 103 itself and the axial electromagnets 106 leading to wasteful energy consumption, and breaks the rotor blades 102 or the like.

Furthermore, even when the vibration of the turbo molecular pump 100A having a narrow gap can be further reduced by, for example, adjusting the magnetic bearing control section 150, the adjustment or the like of the magnetic bearing control section 150 has been performed to satisfy both of the turbo molecular pump 100A, and the turbo molecular pump 100B having a wide gap in the axial direction with less control. As a result, the adjustment cannot be said to be optimal for the turbo molecular pump 100A.

To reduce a variation in the axial position of the rotor shaft 113, the turbo molecular pump 100B or the like may be separately provided with such a mechanism as to automatically adjust the axial direction of the rotor shaft 113 (not shown in the drawing). However, such a mechanism, for which a high accuracy and complexity are required, has caused a possibility of the increase in cost for components. Further, such a mechanism, for which an additional step for adjusting the axial position of the rotor shaft 113 in manufacturing process is required, has also caused a possibility of the increase in cost for manufacturing.

In addition, generally, the turbo molecular pump 100 should be designed so that it can operate in any setting posture, such as a vertical setting posture (with the intake hole 101 directed in the counter-gravitational direction), an upside-down setting posture (with the intake hole 101 directed in the gravitational direction), and a horizontal setting posture (with the intake hole 101 directed vertical with respect in the gravitational direction).

When the turbo molecular pump 100 is installed in the vertical posture, the electromagnet that requires the highest magnetic force among the upper radial electromagnets 104+ and 104−, the lower radial electromagnets 105+ and 105−, and the axial electromagnets 106+ and 106− is the axial electromagnet 106−, which resists a predetermined disturbance against the rotor shaft 113 while attracting the rotor shaft 113 in the counter-gravitational direction. On the other hand, each of the other electromagnets 104+, 104−, 105+, 105−, and 106+ requires a magnetic force enough only to resist the disturbance, and thus doesn't require such a strong magnetic force as required by the axial electromagnet 106−.

Similarly, when the turbo molecular pump 100 is installed in the upside-down posture, the axial electromagnet 106+, which attracts the rotor shaft 113 in the counter-gravitational direction, requires a strong magnetic force, while each of the other electromagnets 104+, 104−, 105+, 105−, and 106− doesn't require a strong magnetic force. Similarly still, when the turbo molecular pump 100 is installed in the horizontal posture, each of the radial electromagnets 104+, 104−, 105+, and 105− require a strong magnetic force, while each of the axial electromagnets 106+ and 106− doesn't require a strong magnetic force.

As described above, depending on the setting posture of the turbo molecular pump 100, each of the electromagnets 104+, 104−, 105+, 105−, 106+, and 106− can be classified as an electromagnet that requires a strong magnetic force, or an electromagnet that does not require a strong magnetic force.

However, in the conventional turbo molecular pump 100, the levitation constant F, by which a strong magnetic force can be generated in each of the electromagnets 104+, 104−, 105+, 105−, 106+, and 106−, has been set (in the levitation constant setting section 161 of FIG. 11) to enables the rotor shaft 113 to be levitated in any setting posture.

As a result, even when the setting posture of the turbo molecular pump 100 is specified (for example, when it is clear that the turbo molecular pump 100 be installed in the vertical posture), a magnetic force stronger then requires could be generated in the electromagnet that does not attract the rotor shaft 113 in the counter-gravitational direction (e.g., electromagnets 104+, 104−, 105+, 105−, and 106+), causing in the vibration of the rotor shaft 113. Thus, the vibration of the entire turbo molecular pump 100B could affect the operation in the chamber. Further, a hard vibration of the rotor 103 could increase heat generated from the rotor 103 itself and the axial electromagnets 106 leading to wasteful energy consumption, and breaks the rotor blades 102 or the like.

SUMMARY OF THE INVENTION

The present invention has been made in view of the above-mentioned problems inherent in the prior art, and an object of the present invention is therefore to provide a magnetic bearing device capable of reducing vibration by preventing a deterioration in the control of a rotor shaft due to a variation in the axial position of the rotor shaft, while performing positional control over the rotor shaft in a specific posture with optimal magnetic force, and to a turbo molecular pump with the magnetic bearing device mounted thereto.

According to the present invention, there is provided a magnetic bearing device including: a rotor supported in a levitating state by electromagnets; an axial position sensor for detecting an axial position of the rotor; characteristic curve adjustment means capable of adjusting a characteristic curve representing a relation between a sensor output voltage of the axial position sensor and an axial position of the rotor; digital conversion means for specifying an upper limit value of the sensor output voltage to perform digital conversion to an output of the characteristic curve adjustment means; and axial position control means for controlling the electromagnets based on an output of the digital conversion means, in which: the characteristic curve adjustment means adjusts the characteristic curve so that a proximal position Zb1 of the rotor when a target provided in the rotor moves the closest to the axial position sensor may become larger than a minimum value Zmin of the axial position of the rotor determined by an upper limit value of the characteristic curve and so that a distance between the proximal position Zb1 of the rotor and the minimum value Zmin of the axial position may become the narrowest one. There could be a variation, due to manufacturing process, in the axial position of the rotor among a plurality of turbo molecular pumps Thus, the characteristic curve adjustment means adjusts the characteristic curve so that the proximal position Zb1 of the rotor may become larger than the minimum value Zmin of the axial position of the rotor determined by an upper limit value of the characteristic curve and so that the distance between the proximal position Zb1 of the rotor and the minimum value Zmin of the axial position may become the narrowest one, by which an optimal characteristic curve can be provided and thus the resolution in a magnetic bearing device having a wide gap in the axial direction can be increased.

This improves the control of the rotor in magnetic bearing device, which leads to the reduction in vibration of the rotor. Also, vibration of the rotor can also be reduced, which leads to the reduction in heat generated from the rotor itself and the axial electromagnets or the like, and to the reduction in wasteful energy consumption.

Further, according to the present invention, there is provided the magnetic bearing device including: a radial position sensor for detecting a radial position of the rotor; radial position control means for controlling the electromagnets based on an output of the radial position sensor; posture detection means for detecting a posture of the rotor with respect to the gravitational direction; constant storage means for storing a constant required for the control performed by the axial position control means and the radial position control means; and constant setting means for setting, in accordance with the posture of the rotor detected by the posture detection means, the constant stored by the constant storage means. With the characteristic curve adjustment means, an optimal characteristic curve can be provided and thus the resolution in a magnetic bearing device having a wide gap in the axial direction can be increased. Thus, vibration generated from the rotor can be reduced by preventing a deterioration in the control of the rotor due to a variation in the axial position of the rotor.

On the other hand, the magnetic bearing device has to operate no matter what kind of posture the rotor is in. However, when the posture of the rotor is specified, each of the electromagnets can be classified as an electromagnet that requires a strong magnetic force, or an electromagnet that does not require a strong magnetic force. Therefore, by changing, in accordance with the posture of the rotor detected by the posture detection means, the constants required for the control performed by the axial position control means and the radial position control means, magnetic force generated from the electromagnet that requires a strong magnetic force can be increased, while magnetic force generated from the electromagnet that does not require a strong magnetic force can be reduced.

Therefore, vibration of the rotor can be reduced when the setting posture of the rotor is specified. The reduction in vibration of the rotor further leads to the reduction in heat generated from the rotor itself and the axial electromagnets or the like, and to the reduction in wasteful energy consumption.

As stated above, vibration generated from the rotor can be reduced by preventing a deterioration in the control of the rotor due to a variation in the axial position of the rotor, and by levitating the rotor in a specific posture with an optimal magnetic force.

Further, according to the present invention, there is provided a magnetic bearing device including: a rotor supported in a levitating state by electromagnets; an axial position sensor for detecting an axial position of the rotor; axial position control means for controlling the electromagnets based on an output of the axial position sensor; a radial position sensor for detecting a radial position of the rotor; radial position control means for controlling the electromagnets based on an output of the radial position sensor; posture detection means for detecting a posture of the rotor with respect to the gravitational direction; constant storage means for storing a constant required for the control performed by the axial position control means and the radial position control means; and constant setting means for setting, in accordance with the posture of the rotor detected by the posture detection means, the constant stored by the constant storage means.

By changing the constant in accordance with the posture of the rotor detected by the posture detection means, magnetic force generated from the electromagnet that requires a strong magnetic force can be increased, while magnetic force generated from the electromagnet that does not require a strong magnetic force can be reduced. Therefore, vibration of the rotor can be reduced when the setting posture of the rotor is specified.

Further, according to the present invention, the magnetic bearing device is characterized in that the characteristic curve adjustment means has one characteristic curve that can be changed and the one characteristic curve is changed to be adjusted.

The characteristic curve adjustment means changes the characteristic curve to increase the resolution in a magnetic bearing device having a wide gap in the axial direction. Thus, the control of the rotor shaft can be improved.

Further, according to the present invention, the magnetic bearing device is characterized in that the characteristic curve adjustment means has a plurality of characteristic curves that cannot be changed and one of the plurality of characteristic curves is selected to be adjusted. The characteristic curve adjustment means selects one from the plurality of characteristic curves to increase the resolution in a magnetic bearing device having a wide gap in the axial direction. Thus, the control of the rotor shaft can be improved.

Further, according to the present invention, the magnetic bearing device is characterized in that the characteristic curve adjustment means has, with respect to each different sensitivity, a plurality of characteristic curves each of which representing a relation between the sensor output voltage and the axial position; and the sensitivity is changed or switched to set a sensitivity which makes the sensor output voltage at the proximal position Zb1 of the rotor be below the upper limit value.

By setting the sensitivity as stated above, the proximal position Zb1 of the rotor can be larger than the minimum value Zmin of the axial position of the rotor determined by an upper limit value of the characteristic curve and, the distance between the proximal position Zb1 of the rotor and the minimum value Zmin of the axial position may become the narrowest one. Thus, the resolution in a magnetic bearing device having a wide gap in the axial direction can be increased, which improves the control of the rotor.

Further, according to the present invention, the magnetic bearing device is characterized in that the posture detection means detects the posture of the rotor, based on a current flowing in each electromagnet controlled by the axial position control means and a current flowing in each electromagnet controlled by the radial position control means.

By judging whether the current flowing in a certain electromagnet is over a specified value or not, it can be judged that whether the electromagnet attracts the rotor in the counter-gravitational direction or not. Thus, it can be judged that the electromagnet attracts the rotor in the counter-gravitational direction. Therefore, the posture of the rotor with respect to the gravitational direction can be detected.

Further, according to the present invention, there is provided a turbo molecular pump including the magnetic bearing device in which: the rotor has rotor blades and a rotor shaft placed at the center of the rotor blades; and each of electromagnet levitates the rotor shaft by a magnetic force.

With the magnetic bearing device as described above, vibration of the rotor can be reduced. Therefore, a turbo molecular pump including this magnetic bearing device capable of reducing vibration can be provided.

BRIEF DESCRIPTION OF THE DRAWINGS

FIG. 13 shows a variation in the axial position.

FIG. 14 shows the relation between the axial position and the sensor output voltage in consideration of a variation in the axial position.

DETAILED DESCRIPTION OF THE PREFERRED EMBODIMENTS

Embodiment 1 of the present invention is described below.

Figure 1:
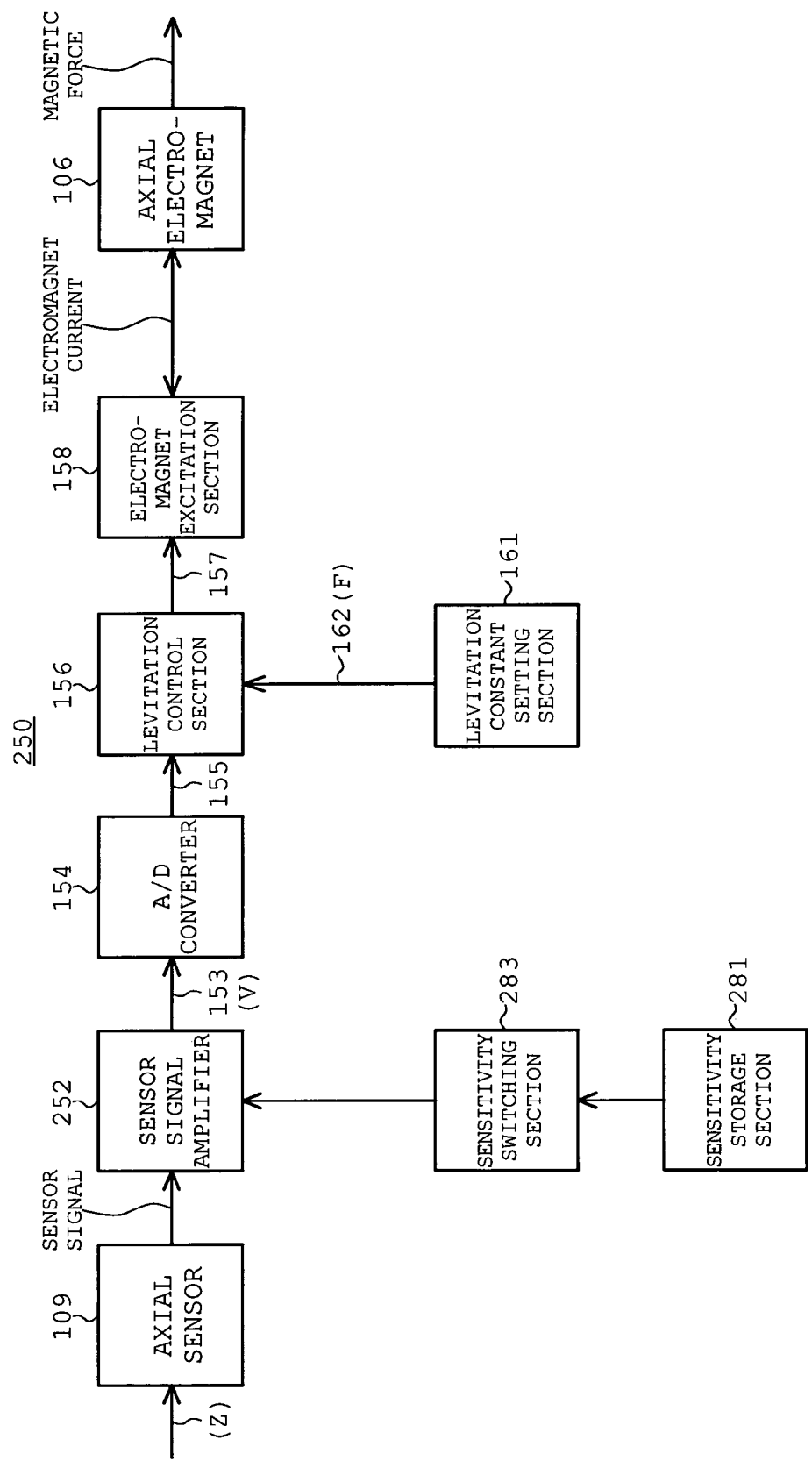
FIG. 1 is a block diagram of a magnetic bearing control section according to Embodiment 1 of the present invention.
Figure 11:
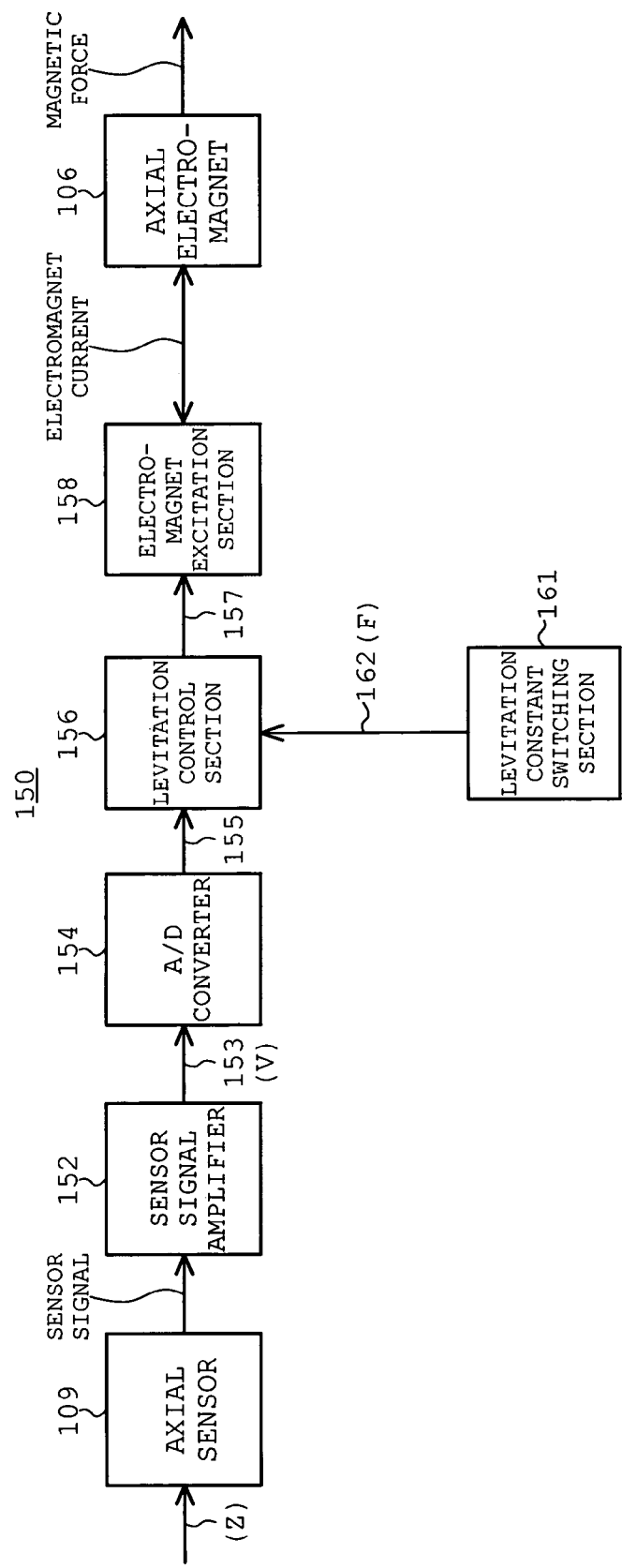
FIG. 11 is a block diagram of a conventional magnetic bearing control section.
Figure 12:
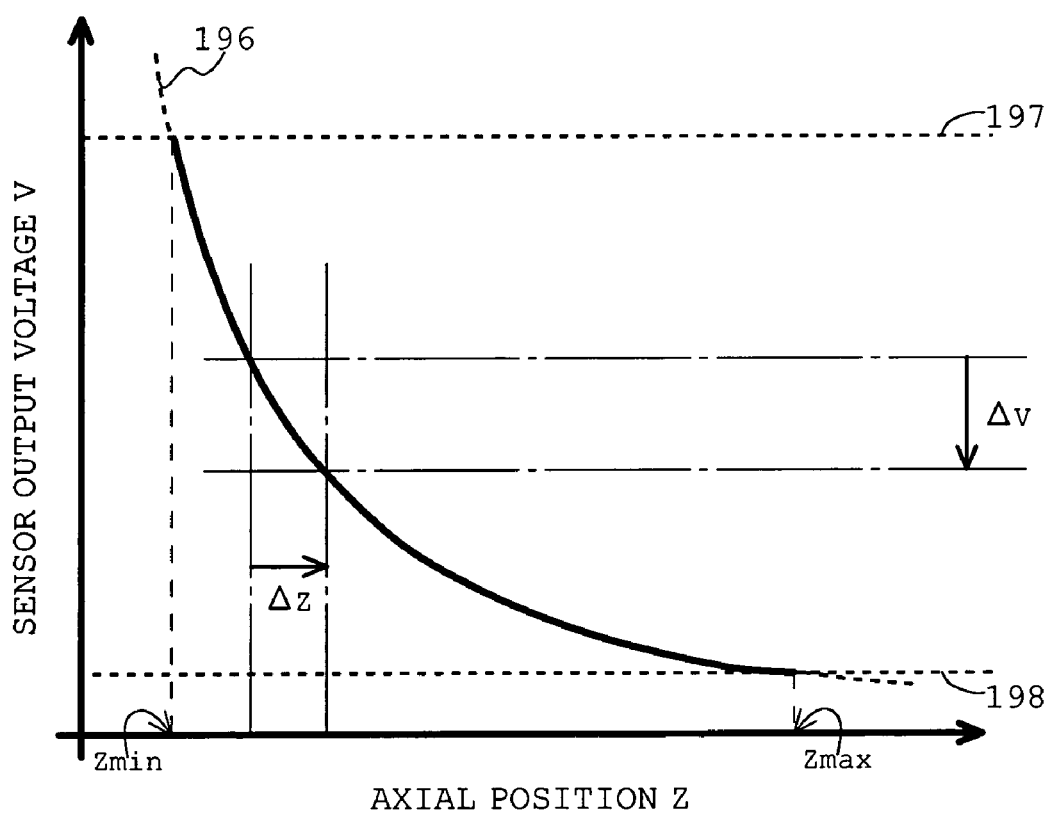
FIG. 12 shows the relation between the axial position and the sensor output voltage in a conventional case.

FIG. 1 shows a block diagram of a magnetic bearing control section according to Embodiment 1 of the present invention. Components in FIG. 1 that are identical with those in FIG. 11 are denoted by the same reference symbols and descriptions thereof are omitted here.

In FIG. 1, a magnetic bearing control section 250 for controlling axial electromagnets 106 has a sensitivity storage section 281. Stored in the sensitivity storage section 281 is a sensor sensitivity which is used in the sensor sensitivity adjustment performed by the sensor signal amplifier section 252, and is thus stored after being automatically set (sensitivity setting operation, which will be described later). The sensor sensitivity adjustment means adjusting a gain value or the like of the sensor signal amplifier section 252.

The sensitivity storage section 281 outputs the stored sensor sensitivity to a sensitivity switching section 283. The sensitivity switching section 283 switches the sensor sensitivity according to the situation, and outputs the result to the sensor signal amplifier section 252. Then, the sensor signal amplifier section 252 performs, to a sensor signal, the sensor sensitivity adjustment according to the sensor sensitivity stored in the sensitivity storage section 281, and outputs, to an A/D converter 154, a sensor output signal 153 having a sensor output voltage V after the sensor sensitivity adjustment.

In this structure, in the case of a turbo molecular pump 100A having a narrow gap in the axial direction (FIG. 13($a$)), stored in the sensitivity storage section 281 is a sensor sensitivity which is the same as of the conventional sensor signal amplifier section 152, and the sensor sensitivity is thus stored after being automatically set (sensitivity setting operation, which will be described later). Therefore, the relation between an axial position Z and the sensor output voltage V in the turbo molecular pump 100A is shown as in prior art (FIG. 14).

Figure 2:
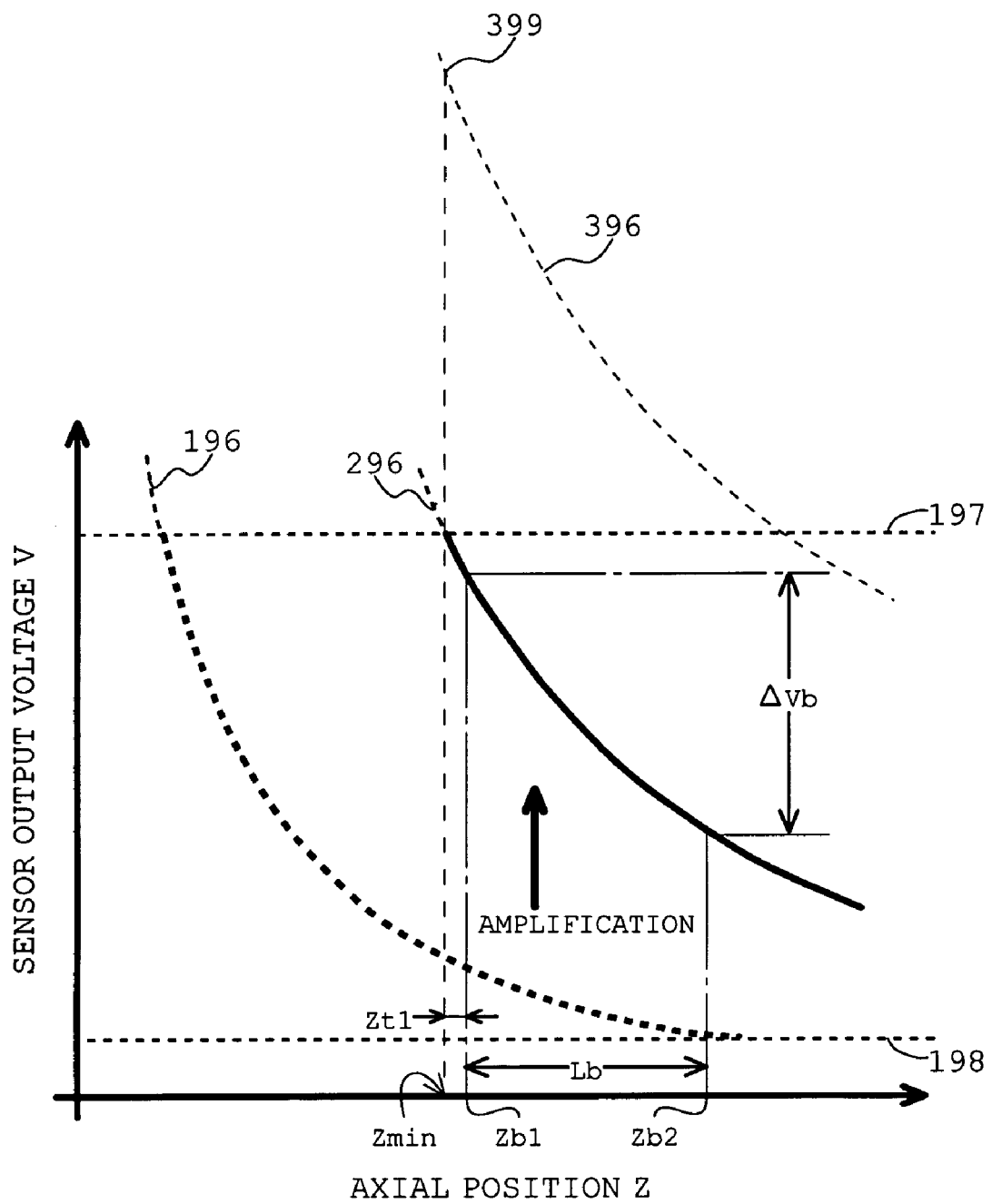
FIG. 2 shows the relation between an axial position and a sensor output voltage according to Embodiment 1 of the present invention.

On the other hand, in the case of a turbo molecular pump 100B having a wide gap in the axial direction (FIG. 13($b$)), the sensor sensitivity is set as described below. FIG. 2 shows the relation between the axial position Z and the sensor output voltage V in the turbo molecular pump 100B.

In FIG. 2, when the sensor sensitivity of the sensitivity storage section 281 is set higher than that of the conventional sensor signal amplifier section 152, the sensor output voltage V of the curve 196 shown in FIG. 14 is amplified. Thus, the relation between the axial position Z and the sensor output voltage V can be represented as a curve 296, which is obtained by amplifying the curve 196.

The amplified sensor output voltage V has an upper limit value 197 or the like determined by the characteristic of the A/D converter 154. Thus, the axial position Z of a rotor shaft 113 has a minimum value Zmin. However, this minimum value Zmin is larger than that of FIG. 14 since the sensor output voltage V of the curve 196 is amplified.

In addition, the sensor output voltage V is in inverse proportion to the square of the axial position Z ($V \propto 1/Z^2$). Thus, the closer the axial position Z of the rotor shaft 113 approaches to the minimum value Zmin, the larger a derivative value dV/dZ of the sensor output voltage V becomes, that is, the higher a resolution Rb (Rb=$\Delta$Vb/Lb) becomes.

In consideration of the above, the resolution Rb (Rb=$\Delta$Vb/Lb) in the turbo molecular pump 100B having a wide gap in the axial direction can become higher than that in prior art, as shown in FIG. 2, by setting the sensor sensitivity of the sensor signal amplifier section 252 so that a proximal position Zb1 can substantially coincide with the minimum value Zmin determined by the upper limit value 197 of the A/D converter 154.

This improves the control of the rotor shaft 113 in the turbo molecular pump 100B, which leads to the reduction in vibration of the rotor shaft 113. Vibration of the entire turbo molecular pump 100B can also be reduced. Further, vibration of a rotor 103 can also be reduced, which leads to the reduction in heat generated from the rotor 103 itself and the axial electromagnets 106, and to the reduction in wasteful energy consumption. Furthermore, rotor blades 102 or the like are not broken by the vibration of the rotor 103.

Figure 3:
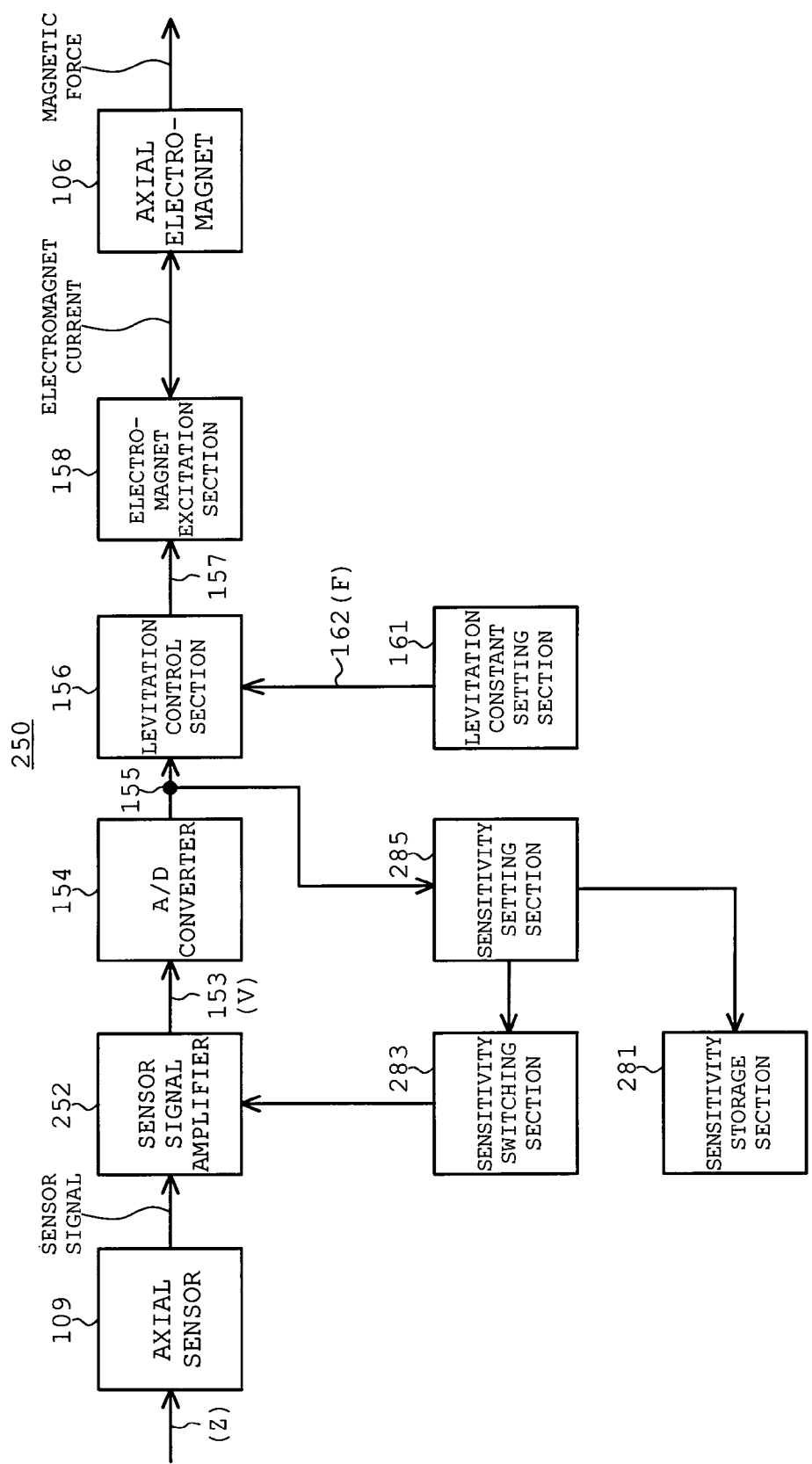
FIG. 3 is a block diagram of a circuit required for a sensitivity setting operation, the diagram being similar to FIG. 1.

Description about setting a sensor sensitivity automatically (sensitivity setting operation) is given below. This sensitivity setting operation is generally performed, when a main body of the turbo molecular pump 100 and a control device thereof is combined with each other, to adjust the levitation of the rotor shaft 113, for example. FIG. 3 shows a block diagram of a circuit of the magnetic bearing control section 250 required for the sensitivity setting operation.

In FIG. 3, the magnetic bearing control section 250 has a sensitivity setting section 285. The sensitivity setting section 285 outputs a signal representing sensor sensitivity to the sensitivity switching section 283. The sensitivity switching section 283 switches the sensor sensitivity in accordance with the situation, and outputs the result to the sensor signal amplifier section 252. The sensitivity setting section 285 outputs a signal which can compulsorily change the sensor sensitivity of the sensor signal amplifier section 252 and which is corresponding to a plurality of sensor sensitivities.

Whenever outputting a signal having a different sensor sensitivity, the sensitivity setting section 285 identifies a digital sensor signal 155 output from the A/D converter 154 and adjusts, based on this digital sensor signal 155, the sensor output signal 153 (sensor output voltage V). At this point, the sensitivity setting section 285 judges whether or not the sensor output signal 153 (sensor output voltage V) is saturated over the upper limit value 197 shown in FIG. 2 etc. Then, based on this judgment regarding whether or not the sensor output voltage V is saturated, the sensitivity setting section 285 stores the sensor sensitivity that is currently output from itself in the sensitivity storage section 281.

Figure 4:
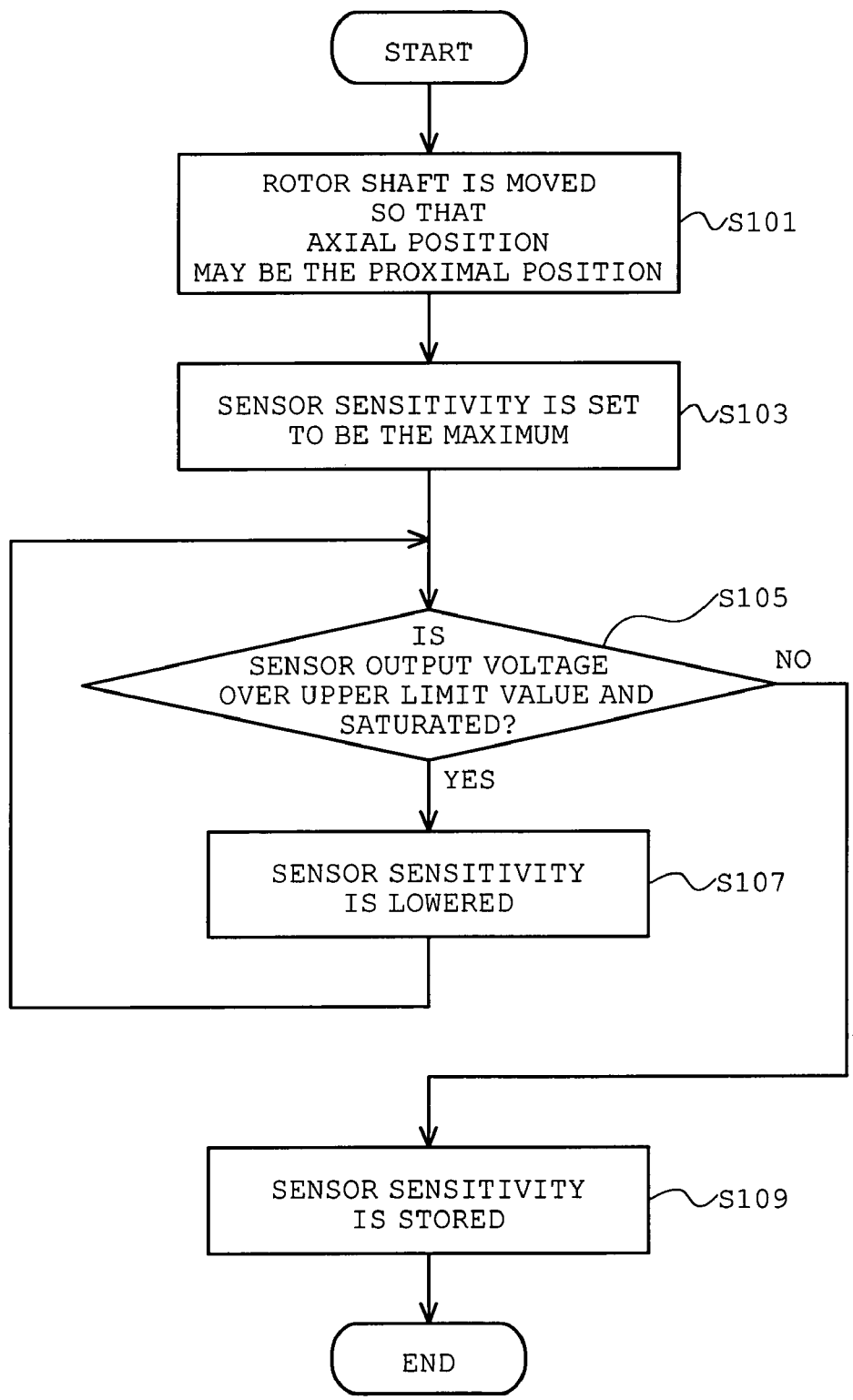
FIG. 4 is a flowchart showing a flow of the sensitivity setting operation.

In this structure, description about a flow of the sensitivity setting operation is given below. FIG. 4 shows a flowchart showing a flow of the sensitivity setting operation.

In FIG. 4, in Step 101 (this is denoted as S101 hereinafter, and the same rule applies to the other similar reference symbols), the rotor shaft 113 is moved so that the axial position Z may be the proximal position. For example, in the case of the turbo molecular pump 100A having a narrow gap in the axial direction (FIG. 13(a)), the rotor shaft 113 is moved to a proximal position Za1, while in the case of the turbo molecular pump 100B having a wide gap in the axial direction (FIG. 13(b)), the rotor shaft 113 is moved to a proximal position Zb1.

Next, in S103, the sensor sensitivity of the sensitivity setting section 285 is set to be the maximum and is output. The sensor signal amplifier section 252 performs, to the sensor signal from an axial sensor 109, a sensor sensitivity adjustment with the maximum sensor sensitivity, and outputs, to the A/D converter 154, the sensor output voltage V after the sensitivity adjustment. Then, the A/D converter 154 performs, to the sensor output voltage V, digital conversion to output the digital sensor signal 155. When the sensor sensitivity is set to be the maximum, the relation between the axial position Z and the sensor output voltage V can be represented as a curve 396 as shown in FIG. 2 (the sensor output voltage V of the curve 396 is further amplified than the above-described curve 296).

In S105, the sensitivity setting section 285 identifies the digital sensor signal 155 to judge whether or not the sensor output voltage V input to the A/D converter 154 is saturated over the upper limit value 197. Specifically, as shown in FIG. 2, judged is whether or not a point 399, at which the proximal position Zb1 of the rotor shaft 113 and the curve 396 is intersected, is over the upper limit value 197. When the sensor sensitivity is set to be the maximum in S103, the sensor output voltage V is normally saturated.

When the sensor output voltage V is judged to be saturated in S105, then in S107, the sensitivity setting section 285 outputs a second lower sensor sensitivity (such a sensitivity as to shift the curve 396 more closer to the curve 296). Thereafter, S105 is performed again. By repeating S105 and S107, the sensor sensitivity from the sensitivity setting section 285 is lowered.

When the sensor sensitivity is lowered enough and the sensor output voltage V is judged not to be saturated in S105, then the sensor sensitivity at that point is stored in the sensitivity storage section 281 in S109.

Stored in S109 is a sensor sensitivity at the point immediately after the sensor output voltage V doesn't get saturated while the rotor shaft 11 is at the proximal positions Za1 or Zb1 (S101). Thus, the proximal positions Za1 and Zb1 of the rotor shaft 113 substantially coincide with the minimum value Zmin of the axial position Z determined by the upper limit value 197 of the A/D converter 154.

Thus, the resolution Rb (Rb=ΔVb/Lb) in the turbo molecular pump 100B having a wide gap in the axial direction can become higher than that in prior art. By performing the sensor sensitivity setting operation as described above, the difference between the resolution Ra of the turbo molecular pump 100A and the resolution Rb of the turbo molecular pump 100B caused due to manufacturing process can be reduced, which improves the control of the rotor shaft 113 in the turbo molecular pump 100B.

Although it has been described, in this embodiment, the sensor sensitivity used in the sensor sensitivity adjustment performed by the sensor signal amplifier section 252 is changed by the sensitivity storage section 281 etc., the present invention is not limited thereto. Instead, a plurality of sensor signal amplifier sections may be adopted to be switched.

Figure 5:
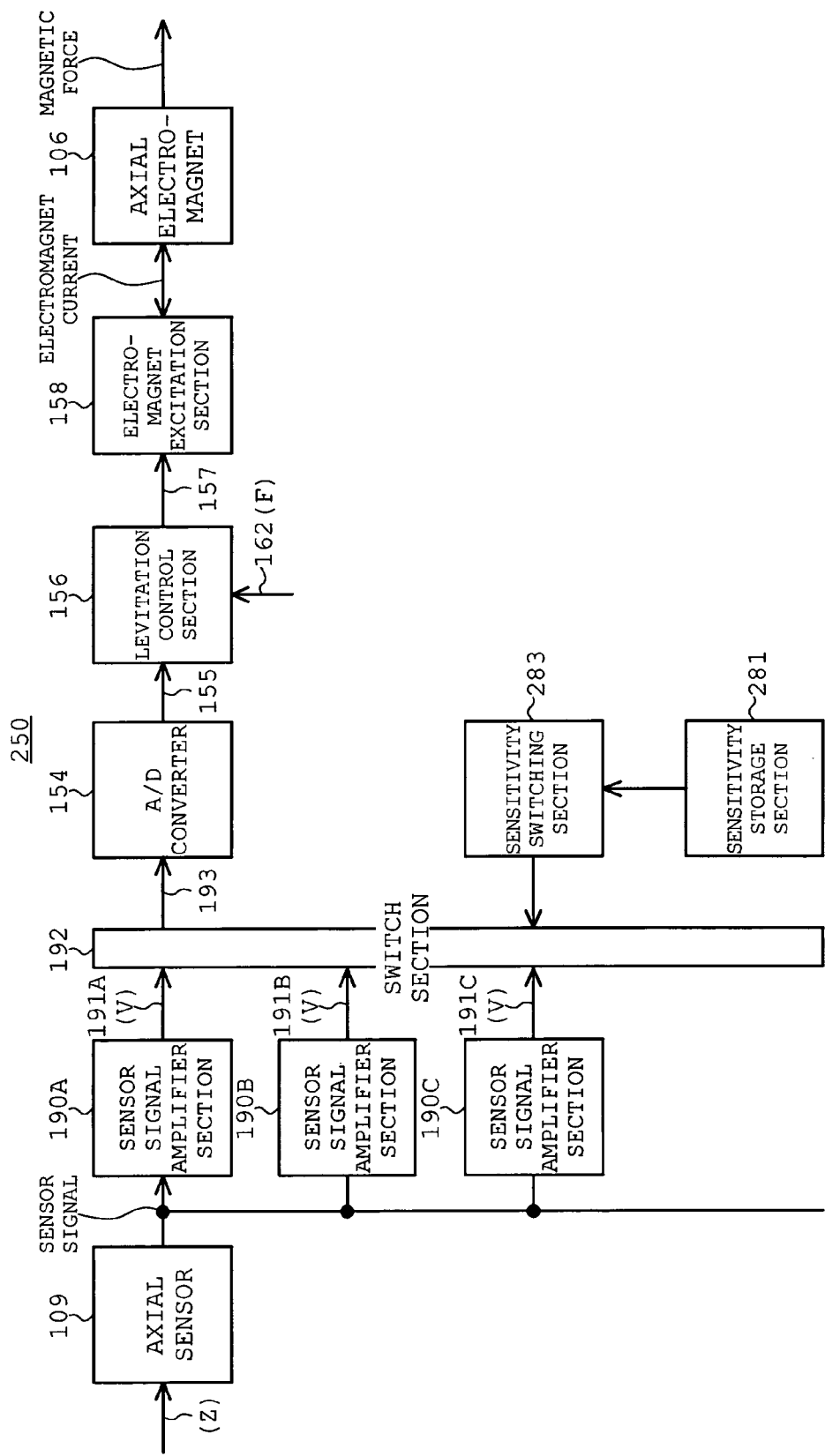
FIG. 5 shows another example of FIG. 1.

In this case, as shown in FIG. 5, each of the sensor signal amplifier sections 190A, 190B, 190C . . . has a different and fixed sensor sensitivity. The sensor signal amplifier sections 190A, 190B, 190C . . . output sensor output signals 191A, 191B, 191C . . . , each of which has a different sensor output voltages V, to a switch section 192 respectively. The switch section 192 selects, based on the control from the sensitivity storage section 281 etc., one of the sensor output signals 191A, 191B, 191C . . . and outputs this signal to the A/D converter 154 as a switch output signal 193. At this point, the switch section 192 selects, as described above, a sensor output signal 191 having such a sensitivity as to be capable of increasing the resolution Rb in the turbo molecular pump 100B.

Figure 6:
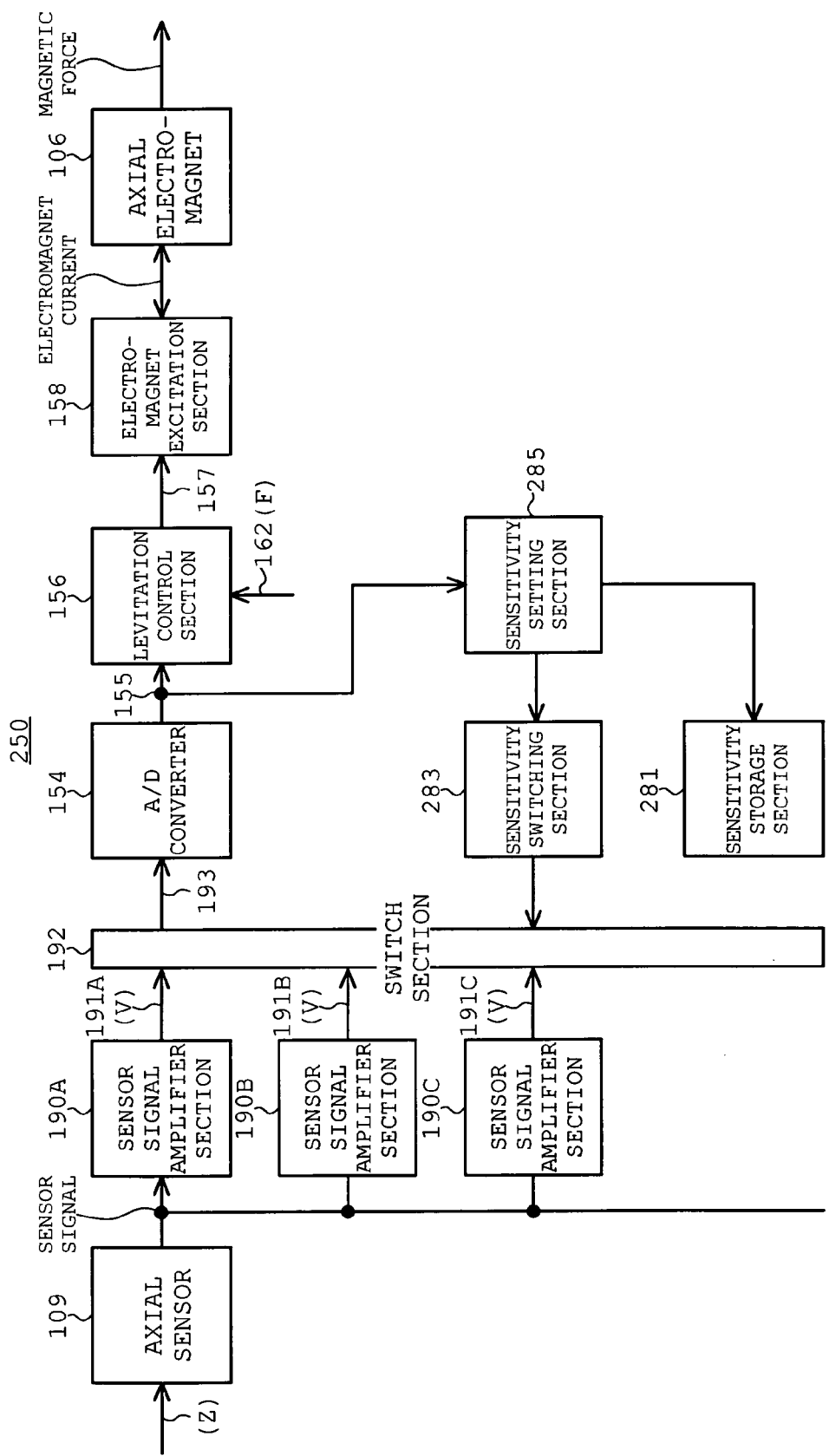
FIG. 6 shows another example of FIG. 3.

On the other hand, in the sensitivity setting operation for selecting the sensor output signal 191 (FIG. 6 shows a block diagram of a circuit), one of the sensor signal amplifier sections 190A, 190B, 190C . . . that has the highest sensor sensitivity is gradually switched to one of the sensor signal amplifier sections 190A, 190B, 190C . . . that has a lower sensor sensitivity as shown in S103 to S107 of FIG. 4. In S105, the sensitivity setting section 285 identifies the digital sensor signal 155 to judge whether or not the sensor output voltage V of the sensor output signal 191 elected by the switch section 192 is saturated. Then, in S109, information etc. of the sensor output signal 191 (one of the sensor output signals 191A, 191B, 191C . . . ) at the point when the sensor output voltage V is judged not to be saturated is stored in the sensitivity storage section 281.

As a result, even when a magnetic bearing control section used is different from those of FIG. 1 and FIG. 3, the resolution Rb in the turbo molecular pump 100B having a wide gap in the axial direction can be increased by performing the sensitivity setting operation. Thus, the control of the rotor shaft 113 can be improved, which leads to the reduction in vibration of turbo molecular pump 100.

Described next is Embodiment 2 of the present invention.

The magnetic bearing control section 250 according to Embodiment 1 reduces vibration by preventing a deterioration in the control of the rotor shaft 113 due to a variation in the axial position of the rotor shaft 113. On the other hand, a magnetic bearing control section according to Embodiment 2 reduces vibration by performing positional control over the rotor shaft 113 in a specific posture with optimal magnetic force.

Figure 7:
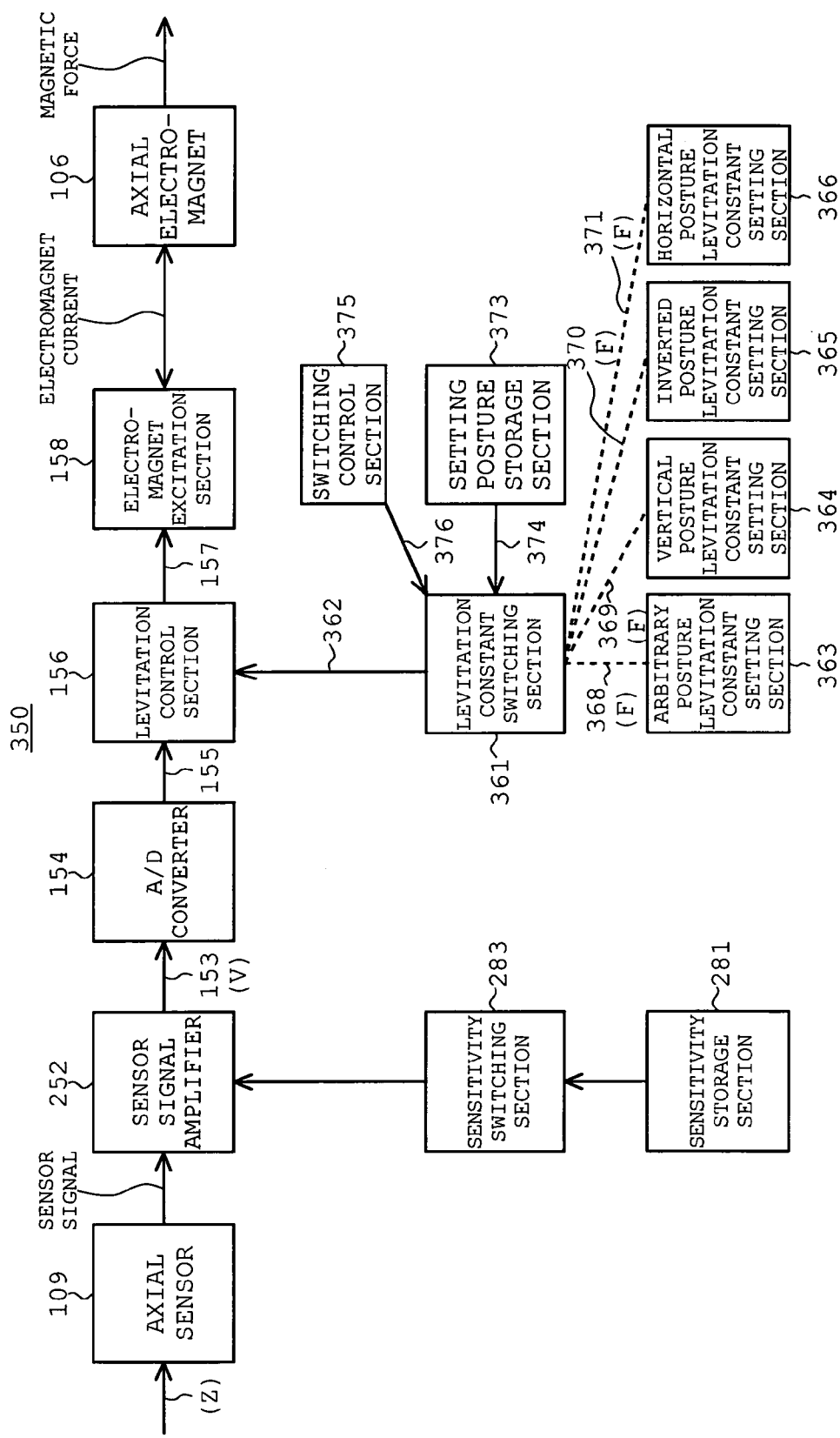
FIG. 7 is a block diagram of a magnetic bearing control section according to Embodiment 2 of the present invention.

FIG. 7 shows a block diagram of a magnetic bearing control section according to Embodiment 2 of the present invention. Components in FIG. 7 that are identical with those in FIG. 1 are denoted by the same reference symbols and descriptions thereof are omitted here.

In FIG. 7, in a magnetic bearing control section 350, a levitation constant switching section 361 outputs a levitation constant signal 362 to a levitation control section 156.

Levitation constant signals 368, 369, 370, and 371 representing levitation constant F are respectively input from the following sections to the levitation constant switching section 361: an arbitrary posture levitation constant setting section 363 that sets a levitation constant F capable of levitating the rotor shaft 113 when the turbo molecular pump 100 is in any setting posture; a vertical posture levitation constant setting section 364 that sets an optimal levitation constant F when the turbo molecular pump 100 is in a vertical setting posture; an upside-down posture levitation constant setting section 365 that sets an optimal levitation constant F when the turbo molecular pump 100 is in an upside-down setting posture; and a horizontal posture levitation constant setting section 366 that sets an optimal levitation constant F when the turbo molecular pump 100 is in a horizontal setting posture.

Set in the arbitrary posture levitation constant setting section 363 is the levitation constant F (hereinafter referred to as levitation constant Fs) capable of invariably generating a strong magnetic force to each of the electromagnets 104+, 104−, 105+, 105−, 106+, and 106−, being set as in the manner in which the levitation constant F in the conventional levitation constant setting section 161 has been set.

Set in the vertical posture levitation constant setting section 364 is the levitation constant F (hereinafter referred to as levitation constant Fw) capable of generating a strong magnetic force to the axial electromagnet 106− requiring a strong magnetic force in the vertical posture, and of generating a weak magnetic force enough to resist a predetermined disturbance to each of the other electromagnets 104+, 104−, 105+, 105−, and 106+. The levitation constant Fw is, with respect to the levitation constant Fs, a constant gained by lowering a value P of the PID adjustment in the levitation control section 156, or a constant gained by changing a parameter of a gain value etc. to lower a stationary current value of the electromagnet current caused to flow in the electromagnets via an electromagnet excitation section 158, for example.

In the upside-down posture levitation constant setting section 365, the levitation constant Fs is set to the axial electromagnet 106+ requiring a strong magnetic force in the upside-down posture, while the levitation constant Fw is set to each of the electromagnets 104+, 104−, 105+, 105−, and 106−. In the horizontal posture levitation constant setting section 366, the levitation constant Fs is set to each of the radial electromagnets 104+, 104−, 105+, and 105− requiring a strong magnetic force in the horizontal posture, while the levitation constant Fw is set to each of the other axial electromagnets 106+ and 106−.

The levitation constant switching section 361, which is input with the levitation constant signals 368, 369, 370, and 371, is further input, from a setting posture storage section 373, with a setting posture signal 374 representing the setting posture of the turbo molecular pump 100. This setting posture signal 374 represents that the turbo molecular pump 100 is in the vertical posture, in the upside-down posture, in the horizontal posture, or in a posture, other than these postures, that cannot be specified. Information of the setting posture is stored in the setting posture storage section 373 after being automatically detected (setting posture detection operation, which will be described later). The levitation constant switching section 361 selects, based on the setting posture signal 374, one of the levitation constant signals 368, 369, 370, and 371, and outputs the selected signal as the levitation constant signal 362.

The levitation control section 156, levitation constant switching section 361, and the levitation constant setting section 363 . . . 366 etc. are not necessarily to be structured by hardware. These may also be structured by software.

Further, the levitation constant switching section 361 is input with an inhibition signal 376 from a switching inhibition section 375. Assuming the case where the turbo molecular pump 100 is used with importance on its ability to resist disturbance, the inhibition signal 376 is set to inhibit the switching of the levitation constant signals 368, 369, 370, 371 in the levitation constant switching section 361, and to select the levitation constant signal 368 output from the arbitrary posture levitation constant setting section 363.

In this structure, when the setting posture signal 374 output from the setting posture storage section 373 represents the vertical posture, the levitation constant switching section 361 selects the levitation constant signal 369 output from the vertical posture levitation constant setting section 364, and outputs this signal to the levitation control section 156 as the levitation constant signal 362. As a result, the rotor shaft 113 is levitated and controlled with an optimal levitation constant F when the turbo molecular pump 100 is in the vertical posture.

When the setting posture signal 374 represents the upside-down posture, the levitation constant switching section 361 selects the levitation constant signal 370 output from the upside-down posture levitation constant setting section 365, and outputs this signal to the levitation control section 156. As a result, the rotor shaft 113 is levitated and controlled with an optimal levitation constant F when the turbo molecular pump 100 is in the upside-down posture.

Further, when the setting posture signal 374 represents the horizontal posture, the levitation constant switching section 361 selects the levitation constant signal 371 output from the horizontal posture levitation constant setting section 366, and outputs this signal to the levitation control section 156.

As a result, the rotor shaft 113 is levitated and controlled with an optimal levitation constant F when the turbo molecular pump 100 is in the horizontal posture.

The setting posture storage section 373 selects, when stored therein is the setting posture signal 374 representing the posture, other than the above postures, that cannot be specified, the levitation constant signal 368 output from the arbitrary posture levitation constant setting section 363, and levitates and controls the rotor shaft 113 with the levitation constant F similar to that of prior art.

As described above, when the turbo molecular pump 100 is set in any of the vertical posture, the upside-down posture, and the horizontal posture, the levitation control section 156 is input with an optimal levitation constant F for each setting posture. As a result, a strong magnetic force is generated only in electromagnet(s) attracting the rotor shaft 113 in the counter-gravitational direction (e.g., the electromagnet 106− in the case of the vertical posture), and a magnetic force stronger then requires is not generated in any of the other electromagnets that does not attract the rotor shaft 113 in the counter-gravitational direction (e.g., the electromagnets 104+, 104−, 105+, 105−, and 106+ in the case of the vertical setting posture) Therefore, vibration of the rotor shaft 113 can be reduced when the setting posture of the turbo molecular pump 100 is specified, which leads to the reduction in vibration of the entire turbo molecular pump 100B. Further, vibration of a rotor 103 can also be reduced, which leads to the reduction in heat generated from the rotor 103 itself and the axial electromagnets 106, and to the reduction in wasteful energy consumption. Furthermore, rotor blades 102 or the like are not broken by the vibration of the rotor 103.

Figure 8:
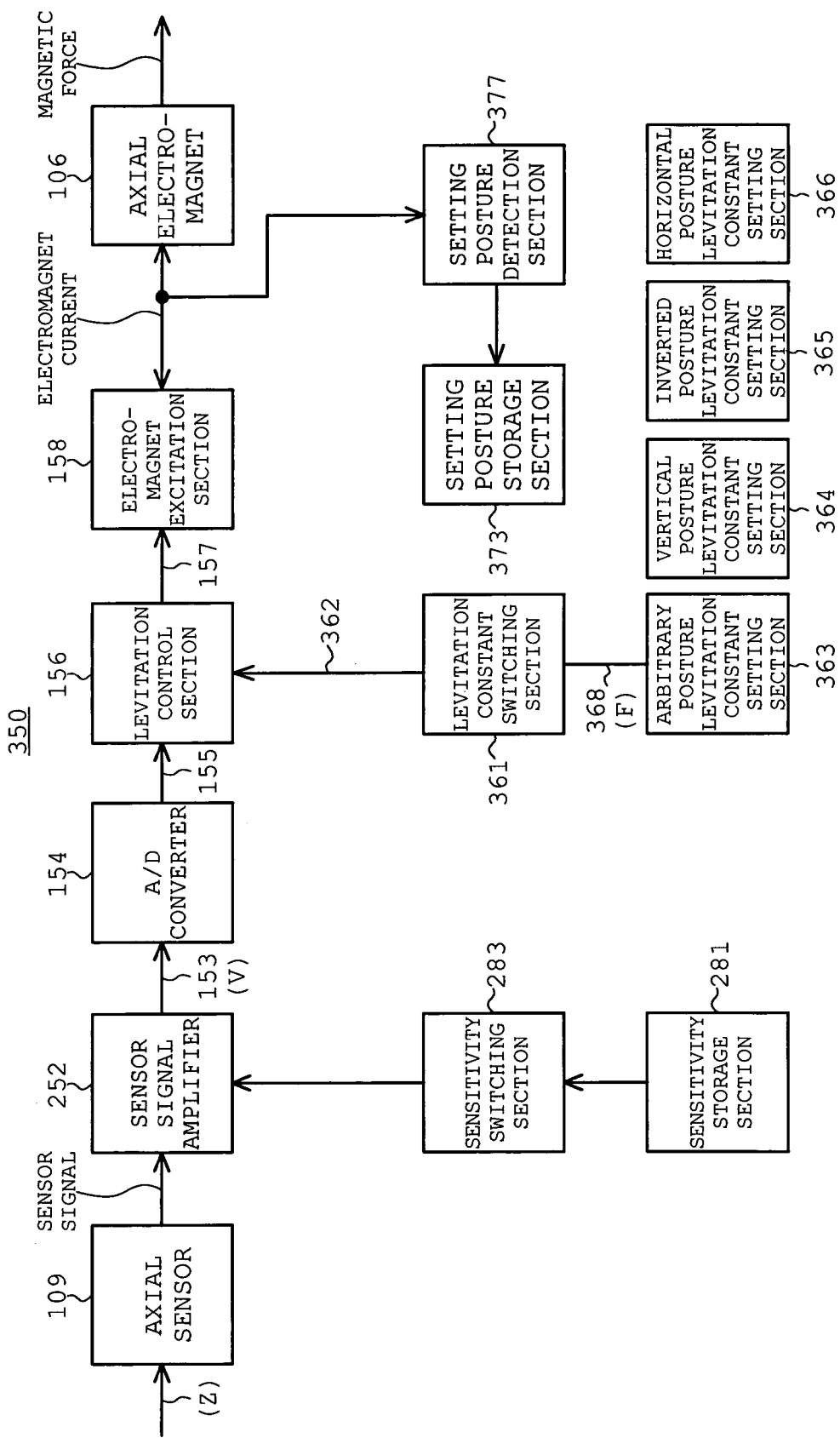
FIG. 8 is a block diagram of a circuit required for a setting posture detection operation, the diagram being similar to FIG. 7.

Description about detecting the setting posture of the turbo molecular pump 100 (setting posture detection operation) is given below. FIG. 8 shows a block diagram of a circuit required for a setting posture detection operation.

In FIG. 8, the magnetic bearing control section 350 has a setting posture detection section 377. The setting posture detection section 377 detects the value of an electromagnet current flowing between the electromagnet excitation section 158 and each of the electromagnets 104, 105, and 106. The setting posture detection section 377 detects, based on this electromagnet current, the setting posture of the turbo molecular pump 100, and stores the detected setting posture of the turbo molecular pump 100 in a setting posture storage section 373. At this point, the levitation constant switching section 361, in which the switching of the levitation constant signals 368, 369, 370, 371 is inhibited, outputs the levitation constant signal 368 output from the arbitrary posture levitation constant setting section 363 to the levitation control section 156.

Figure 9:
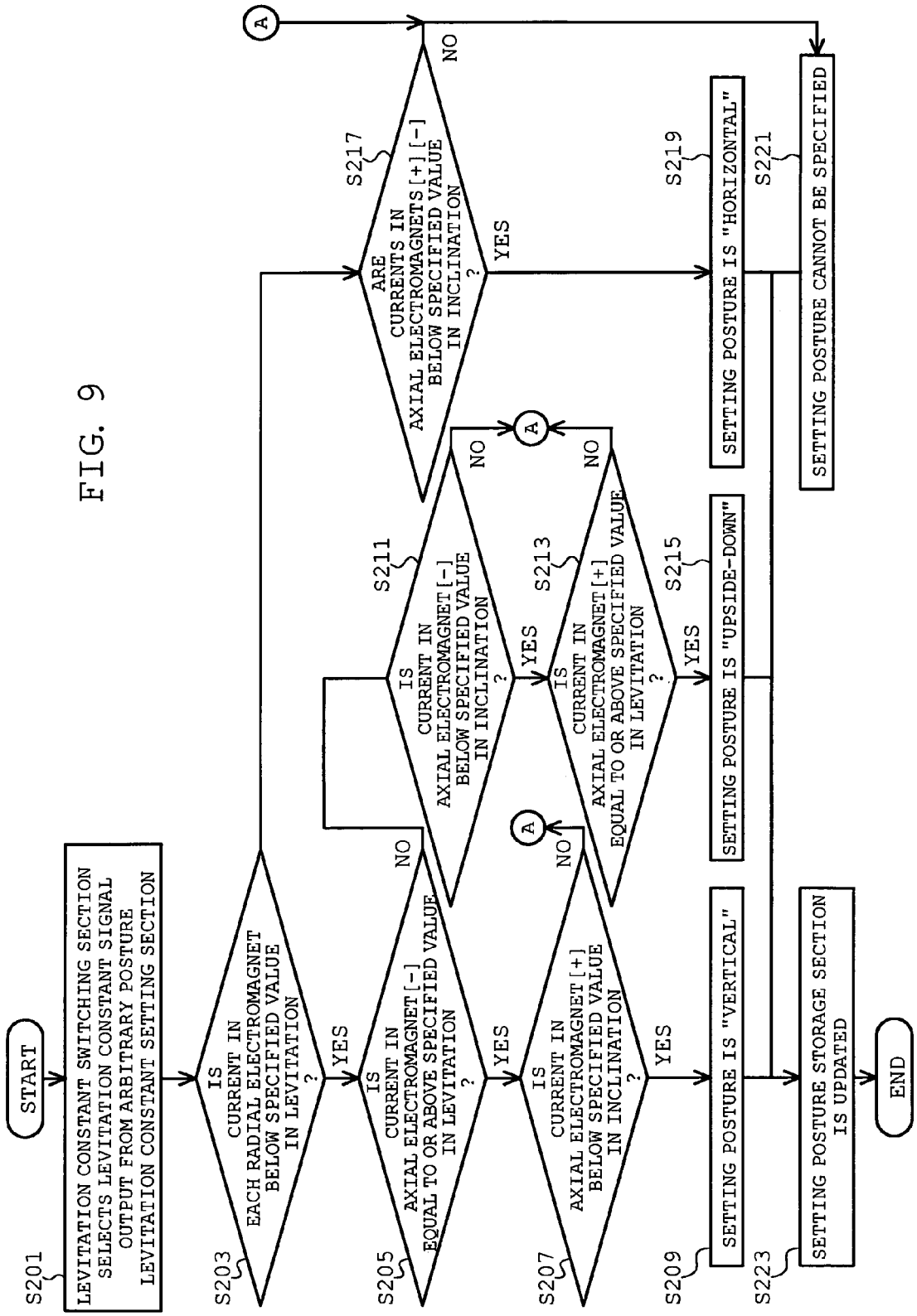
FIG. 9 is a flowchart showing a flow of the setting posture detecting operation.
Figure 10:
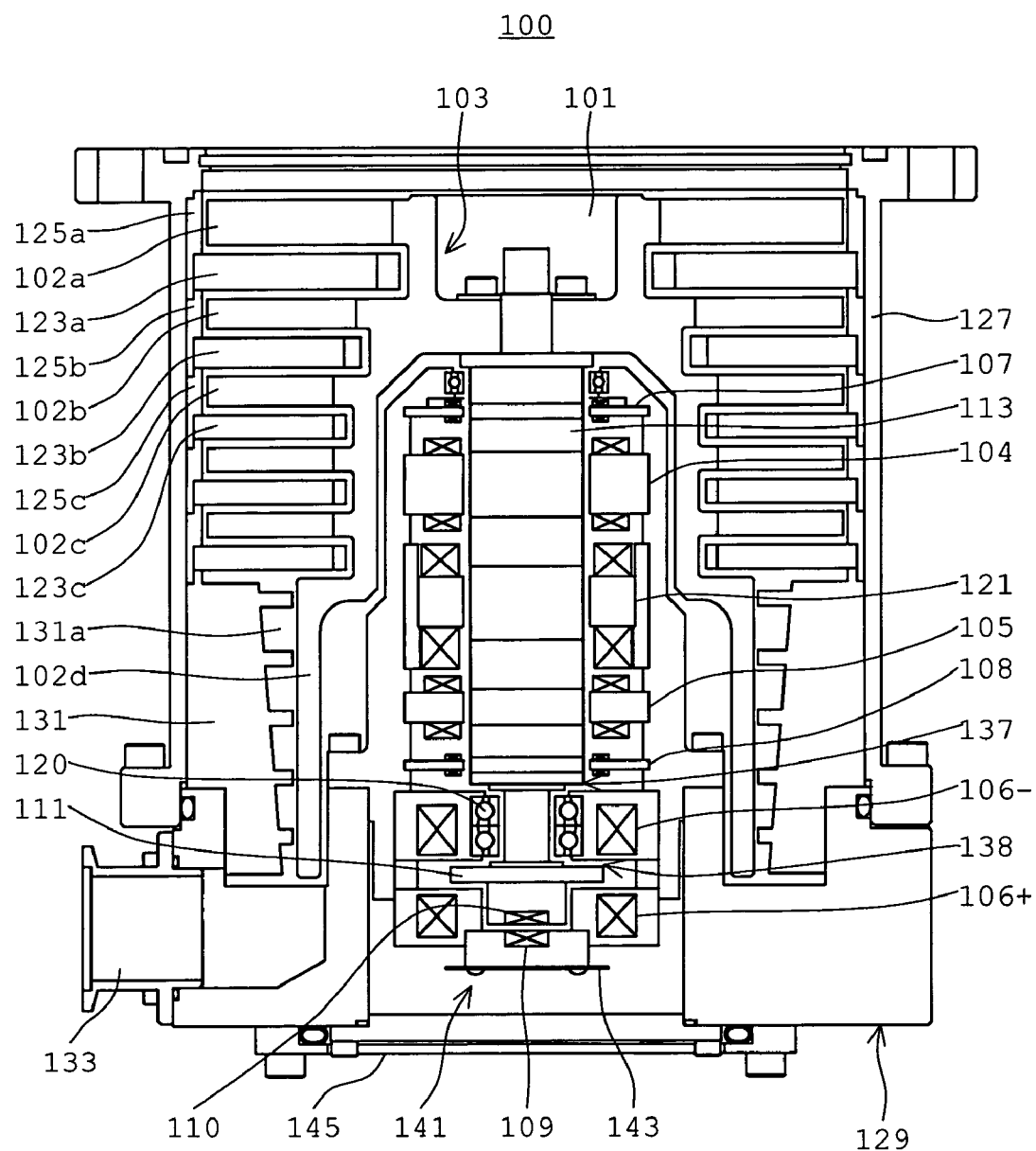
FIG. 10 is a vertical sectional view of a turbo molecular pump.

In this structure, description about a flow of the setting posture detection operation is given below. FIG. 9 shows a flowchart showing a flow of the setting posture detecting operation.

In FIG. 9, in S201, the levitation constant switching section 361 selects the levitation constant signal 368 output from the arbitrary posture levitation constant setting section 363, and outputs this signal to the levitation control section 156. As a result, no matter what kind of posture the turbo molecular pump 100 is set in, the rotor shaft 113 can be levitated to perform the setting posture detection operation.

Next, in S203, the setting posture detection section 377 judges whether or not an electromagnet current flowing in each of the upper radial electromagnets 104 and the lower radial electromagnets 105 is below a specified value in levitation. In S203, the specified value in levitation of the electromagnet current represents the minimum value of the electromagnet current required, when the turbo molecular pump 100 is almost in the horizontal posture, to levitate the rotor shaft 113 with one of any radial electromagnets 104+, 104−, 105+, and 105−.

As a result, in S203, when both of the electromagnet current flowing in the upper radial electromagnets 104 and that flowing in the lower radial electromagnets 105 are below the specified value in levitation, it can be judged that none of the radial electromagnets 104+, 104−, 105+, and 105− requires a strong magnetic force enough to levitate the rotor shaft 113. Thus, the turbo molecular pump 100 is judged to be not in the horizontal posture. On the other hand, in S203, when either of the electromagnet current flowing in the upper radial electromagnets 104 and that flowing in the lower radial electromagnets 105 is not below the specified value in levitation, it can be judged that one of any radial electromagnets 104+, 104−, 105+, and 105− requires a strong magnetic force enough to levitate the rotor shaft 113. Thus, there is a possibility where the turbo molecular pump 100 is in the horizontal posture.

Then, in S203, when both of the electromagnet current flowing in the upper radial electromagnets 104 and that flowing in the lower radial electromagnets 105 are below the specified value in levitation, it is judged whether the turbo molecular pump 100 is in the vertical setting posture or not, or is in an upside-down setting posture or not. Thus, in S205, judged is whether or not the electromagnet current flowing in the axial electromagnet 106− on the minus-side is equal to or above the specified value in levitation. In S205, the specified value in levitation of the electromagnet current represents the minimum value of the electromagnet current required, when the turbo molecular pump 100 is almost in the vertical posture, to levitate the rotor shaft 113 with the axial electromagnet 106−.

As a result, in S205, when the electromagnet current flowing in the axial electromagnet 106− on the minus-side is equal to or above the specified value in levitation, it can be judged that the axial electromagnet 106− requires a strong magnetic force. Thus, there is a possibility where the turbo molecular pump 100 is in the vertical posture. Next, in S207, judged is whether or not the electromagnet current flowing in the axial electromagnet 106+ is below a specified value in inclination. In S207, the specified value in inclination of the electromagnet current represents the value of the electromagnet current required, when the turbo molecular pump 100 is inclined from the upside-down setting posture to some extent, to levitate the rotor shaft 113 with the axial electromagnet 106+. Thus, in a certain electromagnet, the specified value in inclination is smaller than the specified value in levitation.

As a result, in S207, when the electromagnet current flowing in the axial electromagnet 106+ on the plus-side is below the specified value in inclination, it can be judged that only the axial electromagnet 106− requires a strong magnetic force. Thus, in S209, the turbo molecular pump 100 is judged to be in the vertical setting posture.

On the other hand, in S207, when the electromagnet current flowing in the axial electromagnet 106+ on the plus-side is not below the specified value in inclination, it can be judged that a plurality of electromagnets (axial electromagnet 106+ and axial electromagnet 106−) require strong magnetic forces. Thus, in S221, the setting posture of the turbo molecular pump 100 is judged to be unable to be specified (specifically, the turbo molecular pump 100, which is not in the vertical setting posture, the upside-down setting posture, or the horizontal posture, is in a inclined posture).

On the other hand, in S205, when the electromagnet current flowing in the axial electromagnet 106− on the minus-side is below the specified value in levitation, there is a possibility where the turbo molecular pump 100 is in the upside-down setting posture.

Next, in S211, judged is whether or not the electromagnet current flowing in the axial electromagnet 106− on the minus-side is below the specified value in inclination. In S211, the specified value in inclination of the electromagnet current represents the value of the electromagnet current required, when the turbo molecular pump 100 is inclined from the vertical setting posture to some extent, to levitate the rotor shaft 113 with the axial electromagnet 106−. Further, in S213, judged is whether or not the electromagnet current flowing in the axial electromagnet 106+ on the plus-side is equal to or above the specified value in levitation. In S213, the specified value in levitation of the electromagnet current represents the minimum value of the electromagnet current required, when the turbo molecular pump 100 is almost in the upside-down setting posture, to levitate the rotor shaft 113 with the axial electromagnet 106+.

As a result, when the electromagnet current flowing in the axial electromagnet 106− is, in S211, below the specified value in inclination and the electromagnet current flowing in the axial electromagnet 106+ is, in S213, equal to or above the specified value in levitation, it can be judged that only the axial electromagnet 106+ on the plus-side requires a strong magnetic force. Thus, in S215, the turbo molecular pump 100 is judged to be in the upside-down setting posture.

On the other hand, when the electromagnet current flowing in the axial electromagnet 106− is, in S211, not below the specified value in inclination or the electromagnet current flowing in the axial electromagnet 106+ is, in S213, not equal to or above the specified value in levitation, it can be judged that a plurality of axial electromagnets require strong magnetic forces. Thus, in S221, the setting posture of the turbo molecular pump 100 is judged to be unable to be specified.

Furthermore, when the electromagnet current flowing in the upper radial electromagnets 104 or the lower radial electromagnet 105s is, in S203, not below the specified value in levitation, judged in S217 is whether or not both of the electromagnet current flowing in the axial electromagnet 106+ and that flowing in the axial electromagnet 106− are below the specified value in inclination. In S217, the specified value in inclination of the electromagnet current represents the value of the electromagnet current required, when the turbo molecular pump 100 is inclined from the horizontal posture to some extent, to levitate the rotor shaft 113 with both of the axial electromagnets 106+ and 106−.

As a result, when in S217 both of the electromagnet current flowing in the axial electromagnet 106+ and that flowing in the axial electromagnet 106− are below the specified value in inclination, it can be judged that the radial electromagnets 104 and 105 requires strong magnetic forces. Thus, in S219, the turbo molecular pump 100 is judged to be in the horizontal posture. On the other hand, when in S217 both of the electromagnet current flowing in the axial electromagnet 106+ and that flowing in the axial electromagnet 106− are not below the specified value in inclination, it can be judged that a plurality of electromagnets require strong magnetic forces. Thus, in S221, the setting posture of the turbo molecular pump 100 is judged to be unable to be specified.

When, in S209, S215, S219, or S221, the turbo molecular pump 100 is judged to be respectively in the vertical posture, the upside-down posture, the horizontal posture, or the posture that cannot be specified, the setting posture storage section 373 stores, in S223, therein the setting posture (or updates a setting posture that has been previously stored, if any).

As a result, the setting posture of the turbo molecular pump 100 can be automatically detected. By performing the setting posture detection operation as described above when, for example, installing the turbo molecular pump 100, the setting posture thereof can be automatically detected, thereby the optimal levitation constant F can be selected. Thus, vibration of the rotor shaft 113 in a specific setting posture can be reduced, which leads to the reduction in vibration of the entire turbo molecular pump 100B.

What is claimed is:

1. A magnetic bearing device comprising:
  a rotor supported in a levitating state by electromagnets;
  an axial position sensor for detecting an axial position of the rotor;
  characteristic curve adjustment means capable of adjusting a characteristic curve representing a relation between a sensor output voltage of the axial position sensor and an axial position of the rotor;
  digital conversion means for specifying an upper limit value of the sensor output voltage to perform digital conversion to an output of the characteristic curve adjustment means; and
  axial position control means for controlling the electromagnets based on an output of the digital conversion means, wherein:
  the characteristic curve adjustment means adjusts the characteristic curve so that a proximal position Zb1 of the rotor when a target provided in the rotor moves the closest to the axial position sensor may become larger than a minimum value Zmin of the axial position of the rotor determined by an upper limit value of the characteristic curve and so that a distance between the proximal position Zb1 of the rotor and the minimum value Zmin of the axial position may become the narrowest one.

2. The magnetic bearing device according to claim 1 comprising:
  a radial position sensor for detecting a radial position of the rotor;
  radial position control means for controlling the electromagnets based on an output of the radial position sensor;
  posture detection means for detecting a posture of the rotor with respect to the gravitational direction;
  constant storage means for storing a constant required for the control performed by the axial position control means and the radial position control means; and
  constant setting means for setting, in accordance with the posture of the rotor detected by the posture detection means, the constant stored by the constant storage means.

3. The magnetic bearing device according to claim 1, wherein the characteristic curve adjustment means has one characteristic curve that can be changed and the one characteristic curve is changed to be adjusted.

4. The magnetic bearing device according to claim 1, wherein the characteristic curve adjustment means has a plurality of characteristic curves that cannot be changed and one of the plurality of characteristic curves is selected to be adjusted.

5. The magnetic bearing device according to claim 1, wherein:

the characteristic curve adjustment means has, with respect to each different sensitivity, a plurality of characteristic curves each of which representing a relation between the sensor output voltage and the axial position; and the sensitivity is changed or switched to set a sensitivity which makes the sensor output voltage at the proximal position Zb1 of the rotor be below the upper limit value.

6. The magnetic bearing device according to claim 1 comprising:

sensor output voltage amplification means for amplifying the sensor output voltage of the axial position sensor; and an amplification characteristic curve representing a relation between an axial position and a sensor output voltage which are amplified by the sensor output voltage amplification means, wherein the minimum value Zmin of the axial position of the rotor is determined by the amplification characteristic curve and an upper limit value of a characteristic of the digital conversion means.

7. The magnetic bearing device according to claim 6, wherein the sensor output voltage amplification means judges whether or not the sensor output voltage at the proximal position Zb1 of the rotor is over the upper limit value of the characteristic of the digital conversion means while gradually lowering a sensor sensitivity from the maximum, stores a sensor sensitivity or an axial position when the sensor output voltage is below the upper limit value of the characteristic of the digital conversion means, and relates the sensor sensitivity or the axial position to the minimum value Zmin of the axial position of the rotor.

8. The magnetic bearing device according to claim 6, wherein:

the sensor output voltage amplification means consists of sensor signal amplifier sections each of which has a different sensor sensitivity;

the sensor output voltage amplification means includes switching means for switching the sensor signal amplifier sections; and the switching means judges whether or not the sensor output voltage at the proximal position Zb1 of the rotor is over the upper limit value of the characteristic of the digital conversion means while gradually lowering a sensor sensitivity from the maximum, stores a sensor sensitivity or an axial position when the sensor output voltage is below the upper limit value of the characteristic of the digital conversion means, and relates the sensor sensitivity or the axial position to the minimum value Zmin of the axial position of the rotor.

9. A turbo molecular pump comprising the magnetic bearing device according to claim 1, wherein:

the rotor has rotor blades and a rotor shaft placed at the center of the rotor blades; and each of electromagnet levitates the rotor shaft by a magnetic force.

* * * * *